(12) United States Patent
Simpson et al.

(10) Patent No.: US 6,580,789 B1
(45) Date of Patent: Jun. 17, 2003

(54) AUTOMATED PREFIX DIALING SYSTEM

(75) Inventors: Claude O. Simpson, Coral Springs, FL (US); Mark O. Gerwig, Pembroke Pines, FL (US); David G. Storm, Coral Springs, FL (US); Rong Zeng, Boca Raton, FL (US)

(73) Assignee: Immix Telecom, Inc., Sunrise, FL (US)

( * ) Notice: Subject to any disclaimer, the term of this patent is extended or adjusted under 35 U.S.C. 154(b) by 0 days.

(21) Appl. No.: 09/484,889

(22) Filed: Jan. 18, 2000

(51) Int. Cl.$^7$ .......................... H04M 15/00; H04M 1/00
(52) U.S. Cl. ............. 379/114.02; 379/130; 379/216.01; 379/221.02; 379/355.01; 379/355.05; 379/355.08; 455/564
(58) Field of Search ................ 379/90.01, 93.05, 379/100.14, 100.15, 111, 114.01, 114.02, 130, 133, 140, 179, 199, 350, 355.01, 355.05, 355.07, 355.08, 372, 373.01, 387.01, 399.01, 413.01, 216.01, 221.02; 455/564, 565

(56) References Cited

U.S. PATENT DOCUMENTS

| | | | | |
|---|---|---|---|---|
| 3,609,241 A | * | 9/1971 | Riethmeier | 379/100.1 |
| 3,777,067 A | * | 12/1973 | Kilby | 379/442 |
| 4,771,451 A | * | 9/1988 | Ahuja | 379/181 |
| 5,157,719 A | * | 10/1992 | Waldman | 379/356 |
| 5,455,858 A | * | 10/1995 | Lin | 379/355.08 |
| 5,459,774 A | * | 10/1995 | Breeden | 455/566 |
| 5,550,915 A | * | 8/1996 | Partridge, III | 379/355.08 |
| 5,588,049 A | * | 12/1996 | Detering et al. | 379/142.01 |
| 5,668,955 A | * | 9/1997 | deCiutiis et al. | 379/130 |
| 5,710,808 A | * | 1/1998 | Eaton | 379/201.01 |
| 5,859,896 A | * | 1/1999 | Rosen | 379/350 |
| 5,917,904 A | * | 6/1999 | Theis | 379/355 |
| 6,160,884 A | * | 12/2000 | Davis | 379/373 |
| 6,169,791 B1 | * | 1/2001 | Pokress | 379/114 |
| 6,240,175 B1 | * | 5/2001 | Barber | 379/355 |
| 6,269,152 B1 | * | 7/2001 | Jursinski et al. | 379/76 |
| 6,292,557 B1 | * | 9/2001 | Gabara | 379/355.08 |
| 6,345,095 B1 | * | 2/2002 | Yamartino | 379/355.08 |

* cited by examiner

*Primary Examiner*—Melur Ramakrishnaiah
*Assistant Examiner*—Quoc Tran
(74) *Attorney, Agent, or Firm*—Malin, Haley & DiMaggio, P.A.

(57) ABSTRACT

An automated prefix dialing system is disclosed to allow a subscriber/user to automatically insert a predetermined prefix dialing code in certain outgoing telephone call situations. The system is electrically disposed between the telephone company's central office circuit and the subscriber's circuit. The system preferably comprises six sub-circuits: DC power path circuit (off-hook sensor circuit), shadow-ring detector circuit, isolation circuit, DTMF receiver circuit, DTMF generator circuit, and micro controller circuit. When not in use, no power is used by the system. The DC power path circuit, provides power received from the central office line to the various circuits and components of the system when the subscriber's phone is taken off-hook. Off-hook sensor circuitry detects when the telephone has been lifted either in response to an incoming call or to initiate an outgoing call. The shadow ring circuit informs the system if the phone is taken off hook because of an incoming call and functions without any power. When an outgoing call is made, the isolation circuit isolates, the subscriber's phone from the central office line to allow the system to analyze the number being dialed by the user. If the number satisfies certain calling conditions the programmed prefix digits are automatically inserted before the number by the system. Whether or not prefix digits are inserted, DTMF tones, representing the number dialed by the user, must be re-generated by the system and are ultimately transmitted to the central office line, with or without the prefix digits, by the isolation circuit when isolation is removed.

17 Claims, 19 Drawing Sheets

AUTOMATED PREFIX DIALING SYSTEM

BACKGROUND OF THE INVENTION

1. Field of the Invention

The invention to method for processing telephone calls and, more particularly, to a method and device for automatically providing an automatic prefix dialer to specifically determined "outgoing" or "outbound" telephone calls.

2. Description of Related Art

Long-distance Carrier (IXC) Access Codes or Primary interLATA Carrier (PIC) codes identify individual carriers. These codes can be dialed as prefixes by subscribers seeking the least-cost route for their long-distance and international calls. Flexibility and low-cost are the main attractions to the subscriber. In the absence of registration or entry fees, changing carriers is easy. However, the need to dial an identifying prefix can limit the appeal of PIC code dialing.

Alternate access servicers, such as "dial-around" service providers often offer customers low-cost long distance calling by dialing 10-10-XXX. Dial-around service providers typically rely on direct mail and television advertising to attract customers. Furthermore, to use the service, the customer must remember seven additional digits to dial, in addition to the telephone number he or she is calling. Given the large number of dial-around service providers available to a customer, in order to keep its customers, the dial-around service provider must use direct mail, television advertising and/or other forms of advertising and promotion on a continuous and recurring basis. There are several significant inherent weaknesses in this advertising approach, particularly the high cost of advertising and low customer retention. Thus, to retain-a dedicated client base, the dial-around must continually invest in advertising.

Accordingly, what is needed in the art, is a device which will automatically supply a prefix dialer to certain outgoing calls without any action or assistance from the caller, beyond the caller dialing the intended telephone number. It is, therefore, to the effective resolution of the aforementioned problems and shortcomings of the prior art that the present invention is directed.

BRIEF SUMMARY OF THE INVENTION

The present invention provides an automated prefix dialing system to allow a subscriber/user to automatically insert a predetermined prefix dialing code in certain outgoing telephone call situations. With use of the present invention, the prefix digits are not manually entered prior to dialing. The system is electrically disposed between the telephone company's central office circuit and the subscriber's circuit. The system preferably comprises six sub-circuits, namely (1) a DC power path circuit, (2) a ring detector circuit, (3) an isolation circuit, (4) an off-hook sensor circuit, (5) a DTMF receiver and generator circuit, and (6) a micro controller circuit.

When not in use, no power is used by the system. The DC power path circuit, provides power to the various circuits and components of the system when the subscriber's phone is taken off-hook. The power is received from the central office's telephone line. Thus, the DC power path portion of the system uses the direct current from the central office network and maintains constant voltages to the circuits within the system.

Off-hook sensor circuitry detects when the telephone has been lifted either in response to an incoming call or to initiate an outgoing call. When the phone is taken off-hook power is taken by the system from the central office line to perform the various functions of the invention. The shadow ring circuit informs the system if the phone is taken off hook because of an incoming call. If so, the system does not get involved with the telephone call as it does not require the insertion of prefix digits. The shadow ring circuit functions without any power supply, by charging a capacitor of the circuit from voltage received from the central office ring signal, prior to the phone being taken off hook. Once the phone is taken off hook, the microprocessor circuit checks for a charge on the capacitor. If a charge is present, the system knows that the phone was taken off hook to answer an incoming call. Where no charge is present on the capacitor, the system knows that the user is initiating an outgoing call, thus requiring analysis by the system to determine whether or not prefix digits should be inserted before the number being dialed by the user.

When analysis is required (outgoing call), the isolation circuit isolates the subscriber's phone from the central office line to allow the system to analyze the number being dialed by the user without the central office receiving dial tones. If the number satisfies certain calling conditions (long-distance, international, etc.) the programmed prefix digits are automatically inserted before the number by the system. Whether or not prefix digits are inserted, DTMF tones, representing the number dialed by the user, must be generated by the system and are ultimately transmitted to the central office line, with or without the prefix digits.

The DTMF receiver circuit of the system provides amplification to and detection of DTMF signals received from either the subscriber telephone or central office. The processor of the system monitors either tones from the subscriber's telephone or from incoming DTMF tones from central office. It is these DTMF signals that are analyzed to determine whether or not any prefix digits should be inserted before the number dialed by the user.

The DTMF generator circuit generates the DTMF signals corresponding to any prefix digits to be inserted and the number originally entered by the user and forwards such signals to the central office line. At this point, the isolation is removed and the subscriber is reconnected to the central office line. It should be recognized that the present invention is not limited to any specific number of prefix digit(s), and all are considered within the scope of the invention. The present invention can also be designed and/or programmed for use with an extension phone, where a digit/number (i.e. "9") is first entered to get an outside line.

Accordingly, it is an object of the present invention to automatically insert a programmed prefix digit code for certain specifically determined outgoing long-distance and international telephone calls.

It is another object of the present invention to provide an automatic prefix dialer which operates from power received from the central office's phone lines.

It is still another object of the present invention to detect when a subscriber's phone has been taken off-hook to answer an incoming call without any power being supplied to the detection circuitry.

It is yet another object of the present invention to provide an automatic prefix dialer that isolates the subscriber's phone from the central office line while the dialer is analyzing the number being dialed/entered by the subscriber/user.

It is even still another object of the present invention to provide an automatic prefix dialer which help reduce advertising costs of a "dial around" service provider.

It is yet still another object of the present invention to provide an automatic prefix dialer which will help a "dial around" service provider to maintain its customer base.

It is a further object of the present invention to provide an automatic prefix dialer which is relatively low in cost.

It is an even further object of the present invention to provide an automatic prefix dialer which is relatively easy to connect between the central office phone line and subscriber's phone and relatively easy to install/program by the subscriber.

In accordance with these and other objects which will become apparent hereinafter, the instant invention will now be described with particular reference to the accompanying drawings.

DETAILED DESCRIPTION OF THE INVENTION

Figure 1:
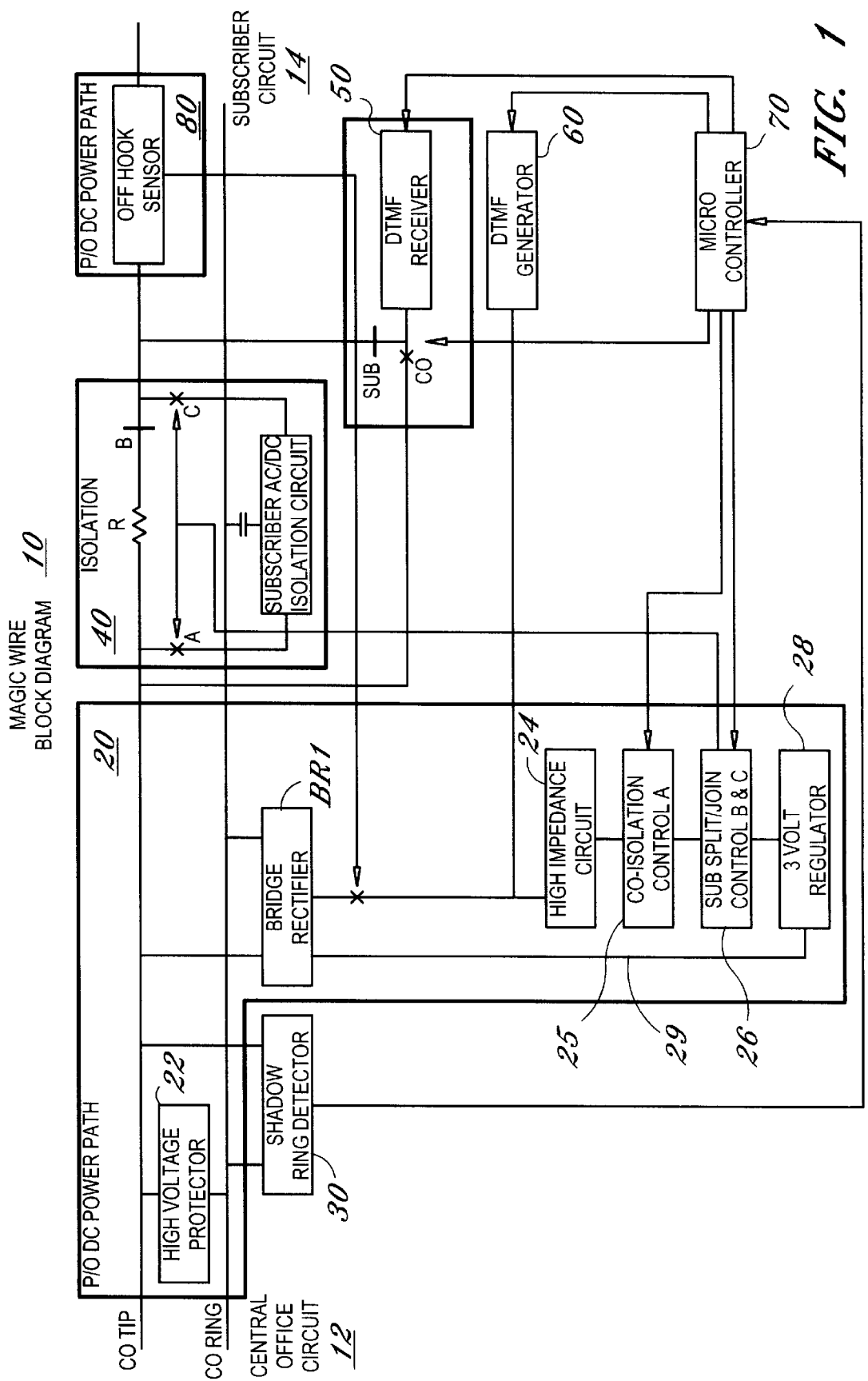
FIG. 1 shows the automated prefix dialing system of the present invention in a block diagram view.

Turning now to the drawings, FIG. 1 schematically illustrates, in block form, the preferred hardware configuration of the automated prefix dialing system of the present invention. The present invention allows a subscriber to utilize a predetermined prefix dialing code, which may be advantageous in certain situations, including taking advantage of low-cost discount dialing rates. With use of the present invention, the prefix digits are not manually entered prior to dialing.

The system shown in FIG. 1, shown generally as reference numeral 10, depicts circuitry that is electrically disposed between the telephone company's central office circuit 12 and the subscriber's circuit 14. The system 10 preferably comprises six sub-circuits, namely (1) DC power path circuit 20, (2) ring detector circuit 30, (3) isolation circuit 40, (4) off-hook sensor circuit 80, (5) DTMF receiver 50, DTMF generator circuit 60, and (6) micro controller circuit 70.

DC power path circuit 20 allows system 10 to use the direct current (DC) from central office network 12 and maintain current throughout subscriber's circuit 14.

Each of the sub-circuits for system 10 will now be discussed in greater detail below.

Figure 2:
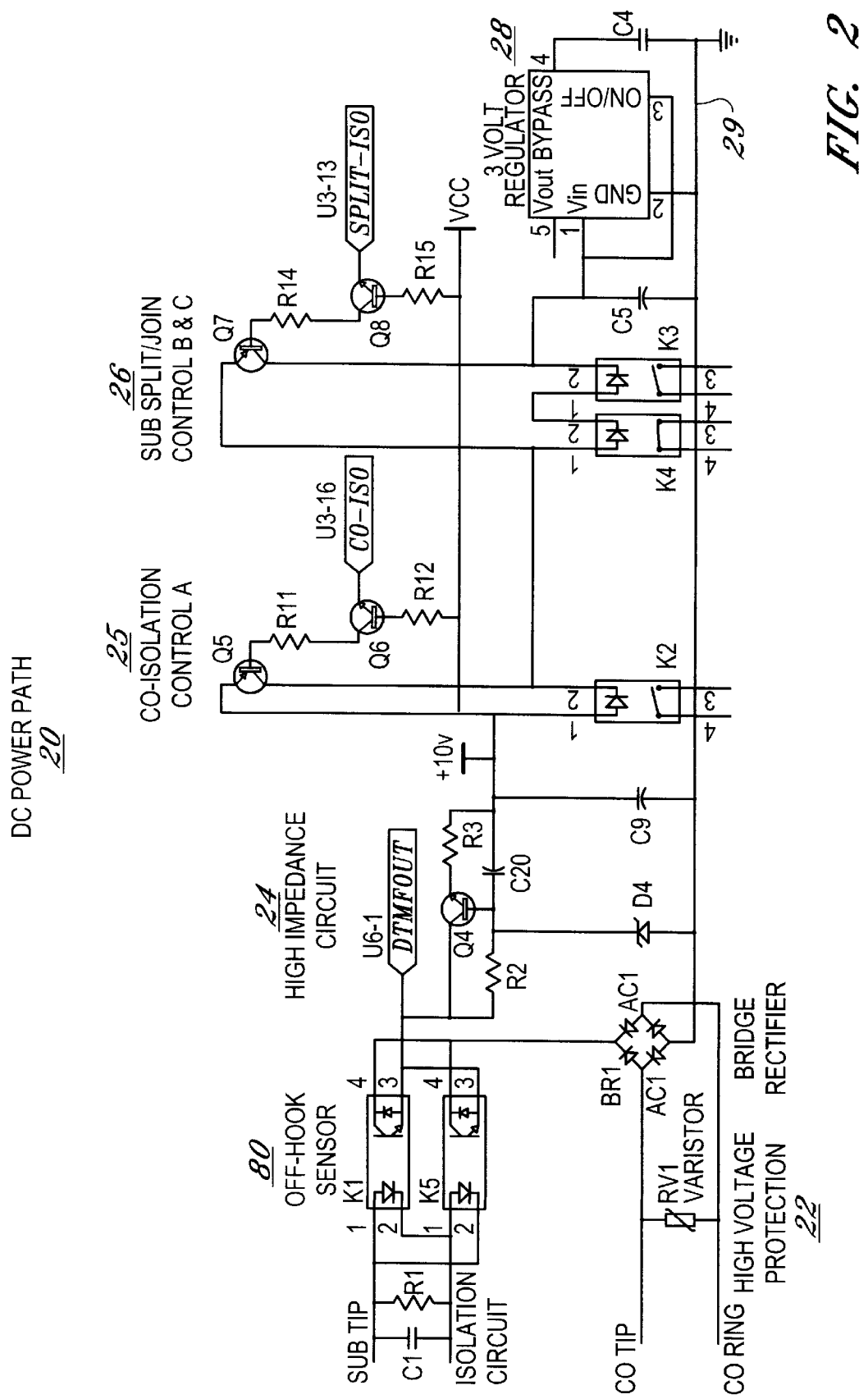
FIG. 2 shows a circuit diagram of the DC power path and off hook sensor sub-circuits of the present invention.

FIG. 2 shows the components of DC power path circuit 20, connected in series. The series connection maintains a steady current flow throughout circuit 20. DC power path circuit 20 develops and assures a constant low voltage (preferably 3 volts DC) power supply to the DTMF receiver 50, DTMF generator 60 and controller 70 circuits.

A high voltage protection sub-circuit 22 suppresses any transient voltages across the central office 10 tip and ring via varistor RV1. Preferably, varistor RV1 suppresses the voltages to 300 volts, however, such value is not limiting and other voltage amounts can be used and are also considered within the scope of the invention. Bridge rectifier BR1 assures the proper polarity of the tip and ring current throughout the circuit. Bridge rectifier BR1 assures that the positive current from either the central office tip or ring is directed to the power supply of system 80. Bridge rectifier BR1 also allows the current to return back to the central office tip and ring circuit.

Off-hook sensor sub-circuit 80 detects if the subscriber's telephone has been lifted either in response to an incoming call or to initiate an outgoing call. As telephone lines can be in any direction (tip and ring reversed), the off hook sensor circuit 80 provides for a bi-directional feed. Circuit 80 comprises capacitor C1 and a resistor R1 connected in parallel, and opto isolators K1 and K5. Capacitor C1 allows the passage of AC power due to ring signals. Resistor R1 acts as a current limiting resistor to allow circuit 80 to sense the telephone current. The input LEDs of K1 and K5 are connected in reverse parallel. As such, the LEDS of either K1 or K5 will turn on depending upon the direction of the current. The output transistors are wired in parallel so that the output of the off-hook sensor will be turned on when either opto isolator, K1 or K5 is activated. The opto isolators act as a switch which activates, when a pre-determined amount of current is detected, to pass DC current through the DC power path between bridge rectifier circuit BR1 and high impedance circuit 24, indicated by the "X" on the DC power path 20 shown in FIG. 1. Where enough current is pulled into system 10, circuit 20 passes the DC current from central office 12 into microcontroller circuit 70. If there is not a sufficient amount of current detected by off-hook sensor circuit 80, the switch does not activate and the microprocessor of system 10 does not receive any power. In this fashion, power can be conserved as the processor will not be in operation until an "off-hook" condition is detected by circuit 80. Thus, for system 10, off-hook sensor 80 turns central office 12 current on/off from bridge rectifier BR1 to high impedance circuit 24. Accordingly, when in use, system 10 runs on DC power received from central office phone line 12.

The high impedance circuit 24, shown in FIG. 2, provides a high input impedance and a low output impedance which eliminates any loading effect of the power supply. This circuit preferably includes a transistor emitter amplifier with a high limit voltage regulator. Transistor Q4 passes current with a minimum voltage drop by feeding an appropriate base current into Q4 via resistor R2. The base of transistor Q4 is ac shunted to ground by capacitors C20 and C9. The input impedance is measured by resistor R2 in parallel with the reflected impedance of the emitter circuit impedance seen from the base. Zener diode D4 prevents excess voltages from entering the power supply path, which could damage the +3 volt regulator U1.

The power supply current flows through co-isolation control "A" circuit 25 and sub-split/join control "B" & "C" circuit 26 depending upon the output of the system microprocessor. Current may flow through either transistor Q5 or opto relay K2 for control circuit A 25, and through either transistor Q7 or opto relays K4 and K3 for control circuit B & C 26. These circuits are placed in series to eliminate additional current loading to the system. The processor can shut off the opto relays by shunting the LED drive currents via their respective control transistors Q5 and Q7. Common base transistors Q6 and Q8, act as DC signal level shifters to provide the interface between the CPU and the respective control transistors Q5 and Q7.

The +3 volt regulator 28, shown in FIG. 2, can be a low dropout linear regulator with capacitor C5 providing DC input filtering and C4 providing ac signal bypass to ground. Voltage is distributed to all integrated circuits, operational circuits, LEDs, and CPU of system 10 along with additional by-pass capacitors. The ground terminal 29 returns to bridge rectifier BR1.

Figure 3:
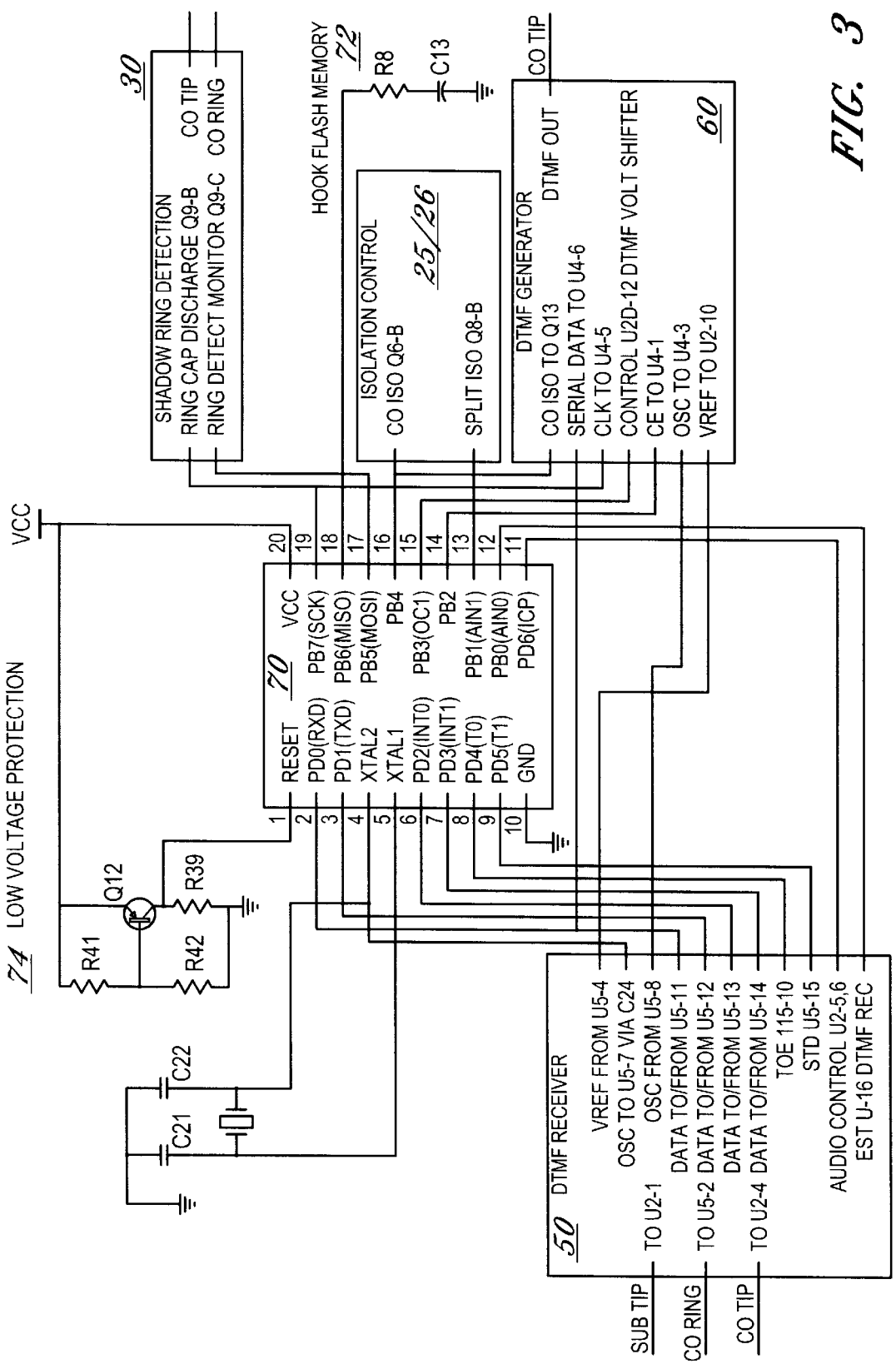
FIG. 3 shows a circuit diagram of the microprocessor and associated circuitry of the present invention.

FIG. 3 shows micro control circuit 70 utilizing the microprocessor U3 of system 10. Microprocessor U3 provides controls to each circuit of system 10 shown in FIG. 1. Microprocessor U3 can be a low power 8-bit microcontroller with its crystal Y1 preferably operating at 3.57954 MHz (clock circuit developed by processor U3) which is also used by DTMF transmitter and receiver circuits 50 and 60. The operating value of crystal Y1, as well as the other characteristics of microprocessor U3, are not considered limiting and other microprocessors, with or without different operating parameters, can be used and are considered within the scope of the invention. Capacitors C21 and C22 provide capacitive loading for crystal Y1.

A low voltage protection sub-circuit 74 is seen in FIG. 3 that essentially shuts down microprocessor U3 should the telephone line current drop below a certain level. If the current drops below the predefine level and microprocessor U3 is not shut down, the customer data within the microprocessor could be affected. To protect the customer data against such "brown out" conditions, low voltage protection circuit 74 is preferably provided and prevents the processor from executing any code when the +3 volt level drops below a certain pre-determined value set by resistors R41 and R42. This level can be approximately 2.6 or 2.7 volts, though other values can be selected and are considered within the scope of the invention. If this low voltage condition occurs, detector transistor Q12 forces the RESET pin 1 of microprocessor U3 to "LOW" via resistor R39. When the voltage returns to a sufficient level, the RESET pin is forced "HIGH" and the processor resets and executes from the beginning of its program.

Figure 7:
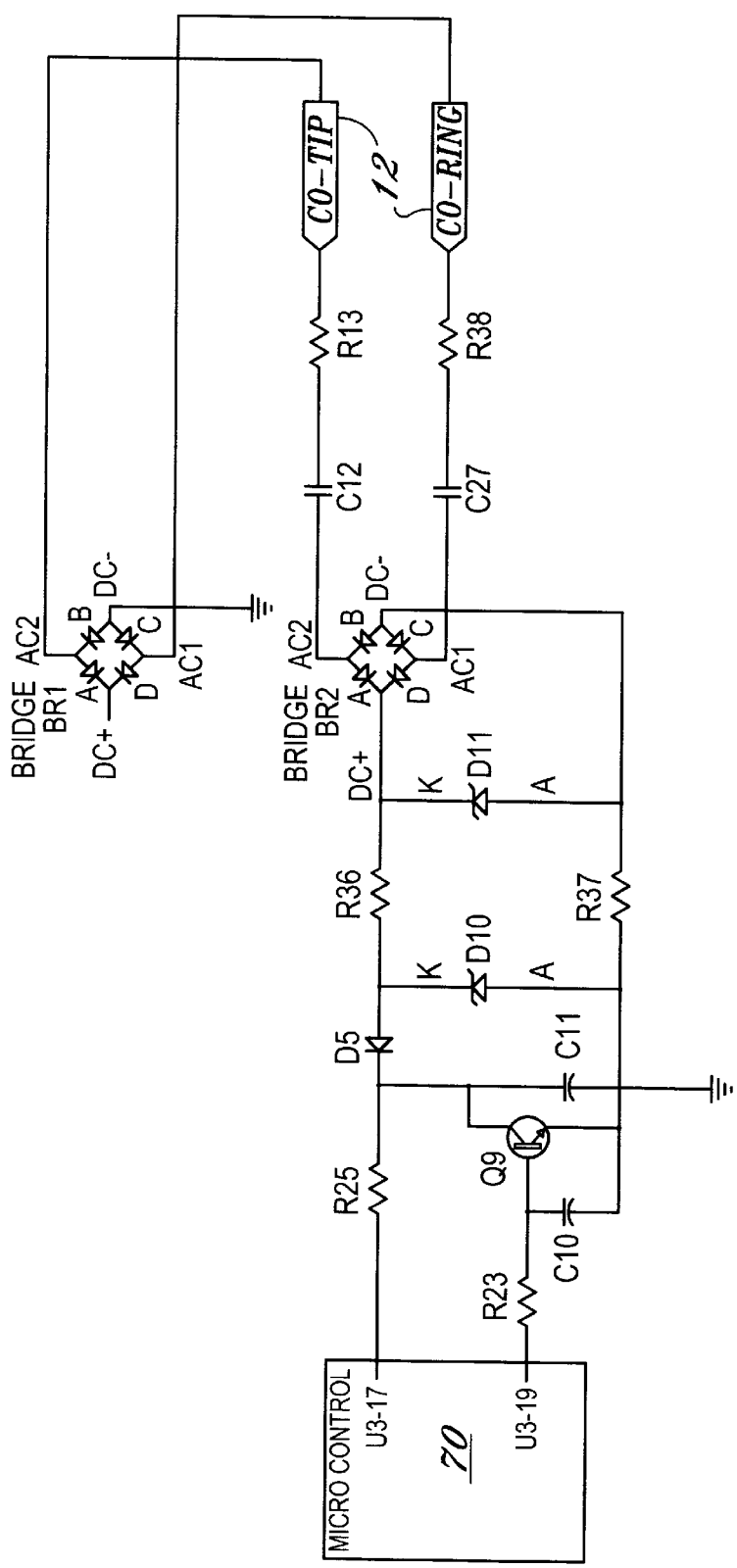
FIG. 7 shows a circuit diagram of the shadow ring detection sub-circuit of the present invention.

Shadow ring detection circuit 30 is shown in block form in FIG. 3, and in circuit diagram form in FIG. 7, is capable of detecting and capturing incoming ring signal presence without power being applied to circuit 30 or system 10. Circuit 30 detects a ring signal without interfering with the actual ringing process and maintains notification that a ring has occurred for a specific time period. Circuit 30 rectifies an incoming high voltage ring signal received from central office 12.

The incoming ring signal from central office 12 may exceed 300 volts peak to peak. Referring to FIG. 7, the incoming ring signal is DC isolated by capacitors C12 and C27, and AC isolated by resistors R13 and R38. Diode bridge BR2 rectifies the incoming ring signal and forward biases zener diode D11 to provide a preferably peak 12-VDC voltage. The pulsating 12 VDC is attenuated by resistors R36 and R37 to a level set by zener D10. This low voltage pulsing charges capacitor C11 via diode D5.

If subscriber phone 14 is picked up when there is a voltage on capacitor C11, microcontroller 70 detects such voltage and disables DTMF signaling since the subscriber/user is answering a phone call not initiating/generating an outgoing call. A low voltage at capacitor C11 enables the subscriber/user to initiate an outgoing call. After initiating the outgoing call, microcontroller 70 discharges capacitor cil by transistor Q9 and resistor R23. Capacitor C10 prevents discharging during powering up of microcontroller U3.

Circuit 30 maintains notification that a ring has occurred for a specific period of time. As stated above, the incoming central office high voltage signal is detected and rectified. Capacitor C11 can be charged to a pre-defined value.

Capacitor C11 is charged when the ringing begins, and can be charged in approximately 100 milliseconds. If the telephone is answered during the ring-cycle, powered from central office line 12 is supplied to system 10, and processor U3, through firmware instructions, examines the charge on capacitor C11, declares an inbound call exists, discharges capacitor C11 and applies a reset notification to the circuit, as there is no need to insert prefix digits. In this way, system 10 does not get involved with the call since it is not an outgoing call. If the call is unanswered and the ring signal terminates, the shadow ring circuit automatically discharges capacitor C11 via resistor R25.

If the telephone is taken off-hook without a ring being applied, power is again supplied to system 10 from central office line 12, and the processor immediately examines the shadow ring circuit to determine if a ring had occurred prior to the off-hook condition of the telephone. Generally, the ring cycle in the United States is approximately 2 seconds on and 4 seconds off. Therefore, if the telephone is picked up, after a non-ring period of approximately 5 seconds, the processor identifies the call as an outgoing one. However, these time periods are not considered limiting, and other values can be selected and are considered within the scope of the invention.

Capacitor C11 must discharge as soon as an incoming call is answered. If not, when a user receives a call, a wrong number for example, then hangs up, certain misreadings could occur when the user wants to place an outgoing call. If capacitor C11 is not discharged completely, the processor may incorrectly sense an incoming call instead of an outgoing call. Therefore, as soon as a capacitor charge is detected on capacitor C11 by microprocessor U3, capacitor C11 is discharged.

Referring to FIG. 3, a RC timer hook flash memory circuit 72 comprised of resistor R8 and C13, is shown. Timer circuit 72 informs processor U3 if an outgoing call has been initiated after a temporary hook flash has occurred. At the end of dialing sequence of an outgoing call, capacitor C13 is charged to "high". If a hook flash is generated after a dialing sequence, processor U3, at least temporarily, shuts down. At power up, processor U3 than executes code by first examining the status of C13. If C13 is still "high", processor U3 knows that an outgoing call was established and that it should not start over in dialing mode, but instead continue, treating the call as if no interruption had occurred. If the hook flash was actually the user hanging up the telephone, capacitor C13 preferably discharges to a "low" state, via resistor R8. In such cases, processor U3 detects this state and resets itself when the user initiates another call.

Figure 4:
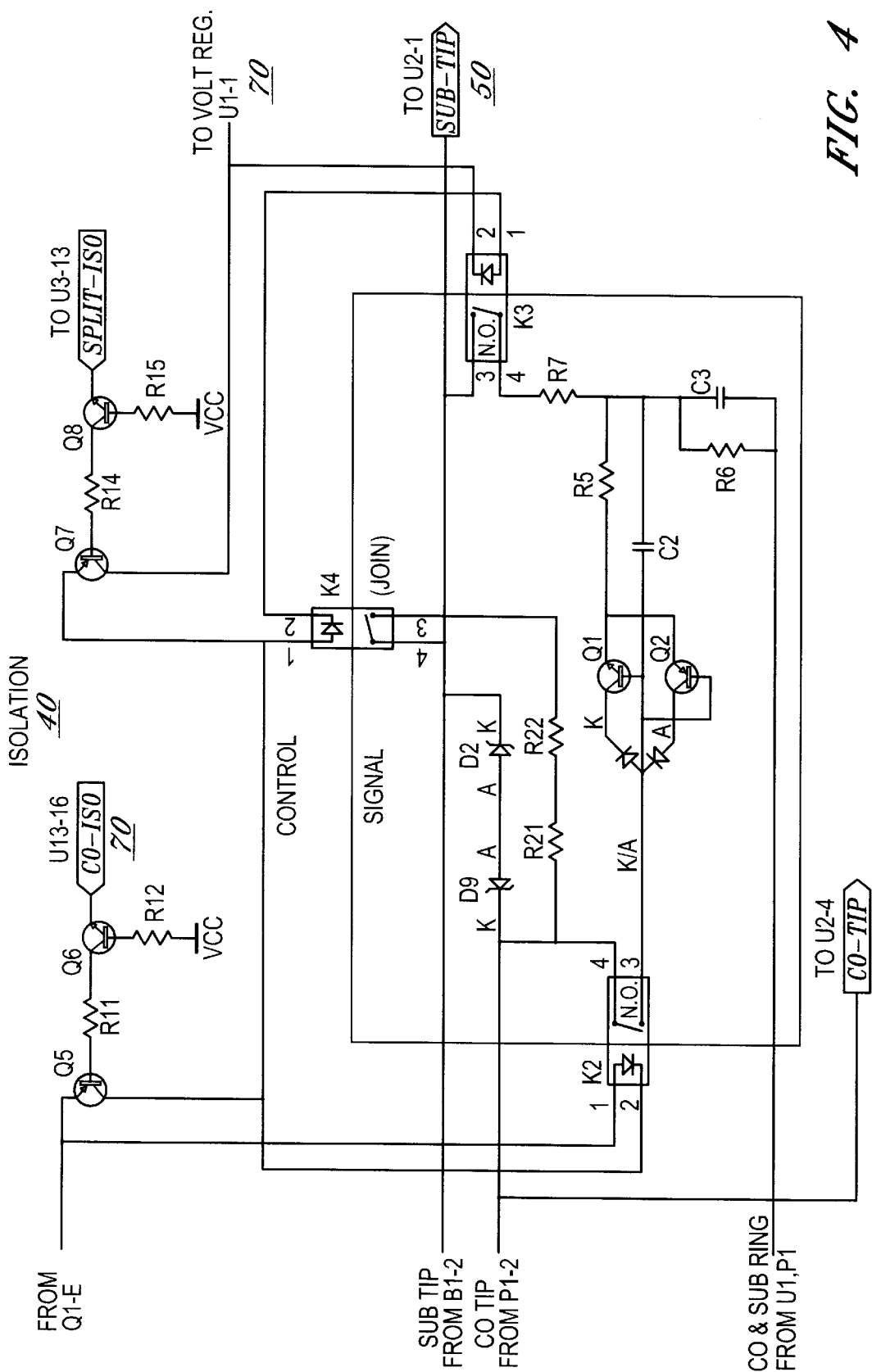
FIG. 4 depicts a circuit diagram of the isolation sub-circuit of the present invention.

FIG. 4 shows the subscriber bi-directional AC isolation circuit 40, with low DC resistance, of the present invention. Isolation circuit 40 is preferably used for switching the subscriber's phone in and out of the central office's communications circuit 12 while maintaining constant DC power to the subscriber, once an off hook condition has been determined by off hook sensor 80 and system 10 has determined that the user is about to make an outgoing call. Isolation circuit 40 is used also for monitoring the DTMF signals via circuit 50 from the subscriber. Thus, circuit 40 isolates subscriber phone 14 from central office 12 while system 10 is analyzing DTMF digits entered by the user.

Circuit 40 allows DC power to pass to subscriber circuit 14, while blocking AC signal. The passing of DC power from central office line 12, powers system 10 when the ph one is lifted "off hook". The blocking of the ac signal allows system 10 to detect the subscriber's DTMF digits, while preventing detection also by central office 12. Control for the isolation circuit is from system micro controller 70 via transistors Q5, Q6, Q7 and Q8. To switch in and out of central office's circuit 12, a high impedance input and low impedance output amplifier between central office line 12 and subscriber's phone 14 is inserted.

When it is determined that the phone has been lifted off hook, resistors R21 and R22 provide a relatively small voltage drop to subscriber's phone 14 to allow a higher voltage to the main power path via bridge rectifier BR1. Also at this moment, the normally open (n.o.) switch of opto relay K2 closes, thus charging capacitors C2 and C3 to allow the isolation amplifier to become ready for operation. The switching out from the central office line 12 can cause a tremendous. DC shift, which can produce a user detected audible sound if the switching occurs at a later time after the off-hook has been detected. Furthermore, the audible noise/sound may also interfere with the DTMF signal detection if the switching occurs at a later time after the off-hook has been detected.

As soon as the DTMF receiver detects the first DTMF digit being dialed from subscriber phone 14, the normally closed (n.c.) contacts of opto relay K4 open and the normally open (n.o.) contacts of opto relay K3 close based on commands received from microcontroller 70. These actions by relays K3 and K4 switches the subscriber from central office 12, while maintaining a DC balance. A DC current is also received from central office line 12 via the isolation circuit.

A DTMF signal is preferably detected within 10 milliseconds, by DTMF receiver circuit 50, and is passed along to microprocessor U3. Microprocessor U3 than signals isolation circuit 40 via transistors Q5–Q8 and opto relay $K^4$ opens and opto relay K3 closes. Zener diodes D2 and D9 prevent a temporary loop current drop during the switching of relays K3 and K4. The switching of the relays preferably occurs within 20 milliseconds of the entering of the DTMF tone. After switching, subscriber circuit 14 becomes isolated from central office 12, while maintaining DC current. At this point, central office 12 does not receive the valid entered DTMF signal since only 20 milliseconds have preferably transpired, and central office 12 generally recognizes a valid DTMF tone after a signal length of approximately 40–50 milliseconds. Thus, system 10 can begin analyzing the entered DTMF tones and determine if any automated prefix digits need to be dialed/inserted, prior to reestablishing (switching back) communication with central office line 12. Accordingly, this analysis of whether to insert prefix digits, occurs without central office 12 detecting a valid DTMF signal.

Preferably, isolation circuit 40 includes double diodes (D2. D9) and double resistors (R21, R22), though a diode bridge circuit could be employed, though not preferred. Transistors Q1 and Q2 and diode D1, resistors R1, R5, R6, and R7, and capacitors C2 and C3 define a bi-polar capacitor amplifier circuit, which functions as the high impedance input and low impedance output amplifier between central office line 12 and subscriber phone 14. Diode D1 prevents reverse bias on the collectors of transistors Q1 and Q2. Capacitors C2 and C3 provide low ac impedance on the emitter output of the amplifier. Resistor R7 provides impedance for the subscriber's phone. The design provides for high ac resistance and low DC voltage drops.

After isolation, should the subscriber enter DTMF signals that require prefix digit insertion, or if the processor determines that the outgoing call is one that will not be handled by system 10, the DTMF generator circuit 60 quickly generates the entered numbers, "catches up" to the subscriber's dialing and the subscriber is "put back" on the central office line 12. At this point isolation has been removed, meaning the contacts of relay K3 are in an open position, and the contacts of relay K4 are in a closed position.

Figure 5:
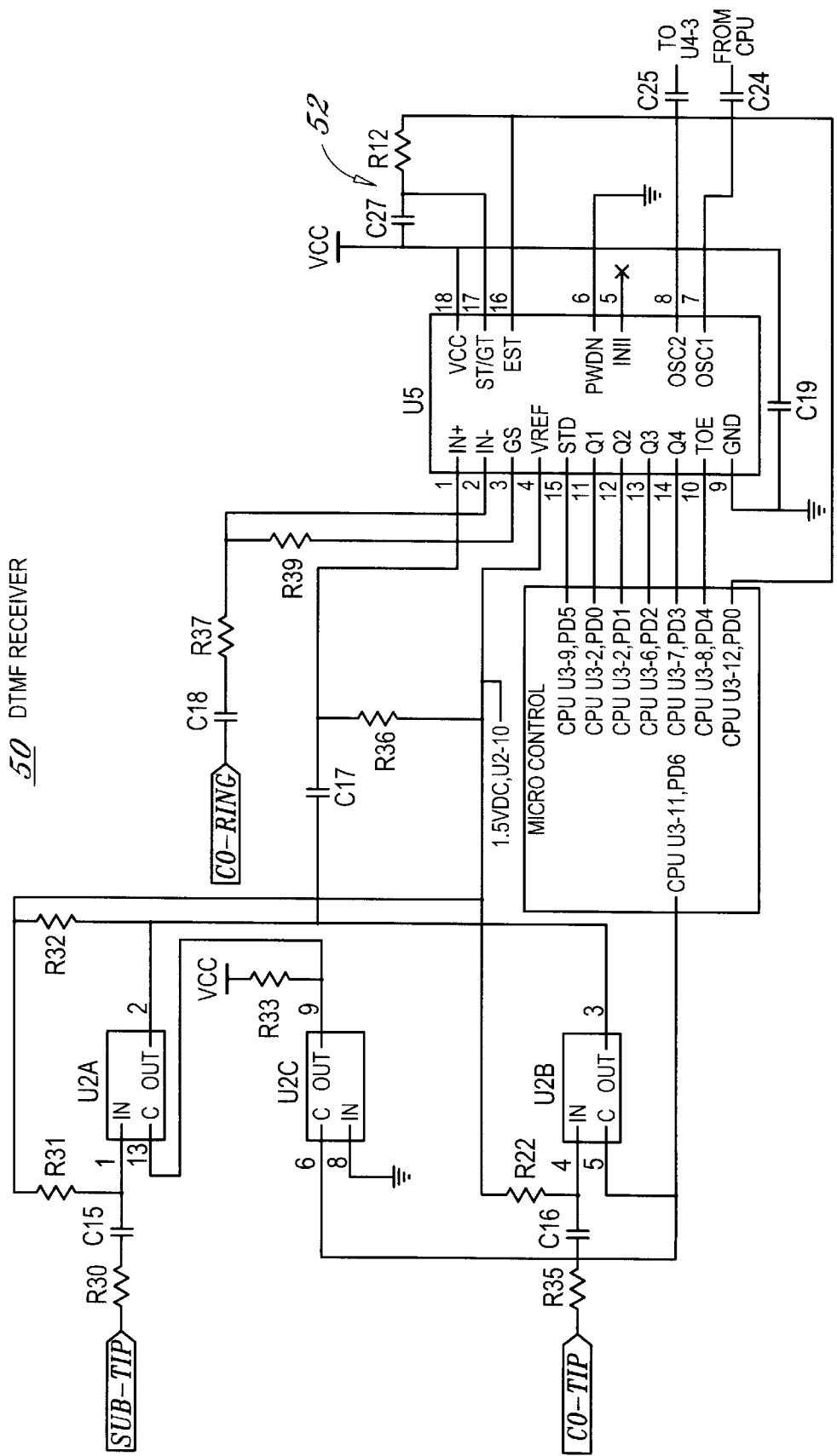
FIG. 5 shows a circuit diagram of the DTMF receiver sub-circuit of the present invention.

FIG. 5 shows DTMF receiver 50 and associated circuitry of system 10. DTMF receiver circuit 50 provides amplification to and detection of DTMF signals received from either the subscriber telephone 14 or central office 12. Processor U3 monitors either tones from the subscriber's telephone 14 or from incoming DTMF tones from central office 12 via analog switches U2A, U2B, and U2C. The analog inputs and outputs of switches U2A and U2B are preferably held to +1.5 VDC via resistors R31, R32, and R22. The voltage, preferably one-half of the supply voltage, is generated by U5, pin 4 ($V_{ref}$). Switch U2C is wired as a logic inverter for the processor control signal so that either switch U2A or switch U2B, but not both, is on. Resistor R33 is a pull up resistor.

Resistors R36, R37, and R39 provide a differential input to the amplifier of U5 which amplifies the received DTMF signal. This circuit ensures proper DTMF signal levels to the rest of the circuits of U5. Steering circuit 52 is preferably comprised of capacitor C27 and resistor R42 and provides a signal to processor U3 when the subscriber first initiates a DTMF signal. The signal received from steering circuit 52 causes processor U3 to activate the isolation circuit as discussed above which will isolate subscriber's phone 14 before any entered DTMF signals are detected by central office 12. Accordingly, the signal sent by steering circuit 52 to processor U3 occurs before central office circuitry 12 detects the initiated DTMF signal.

The circuit-timing clock signal developed,by processor U3 is supplied to U5 via capacitor C24 at pin 7(OSC1) of U5. This, oscillated signal is passed through at pin 8(OSC2) of U5 to the DTMF generator circuit (FIG. 6) via capacitor C25.

Two control lines, STD and TOE and four data lines, Q1–Q4 (pins 11–14 of U5) communicate with processor U3. Control signal STD informs the processor (at pin 15 of U5) that a valid DTMF signal has been detected. Control signal TOE enables the data present on the four data lines, Q1–Q4, which represent the received digits, which will be sent from U5 to processor U3.

Figure 6:
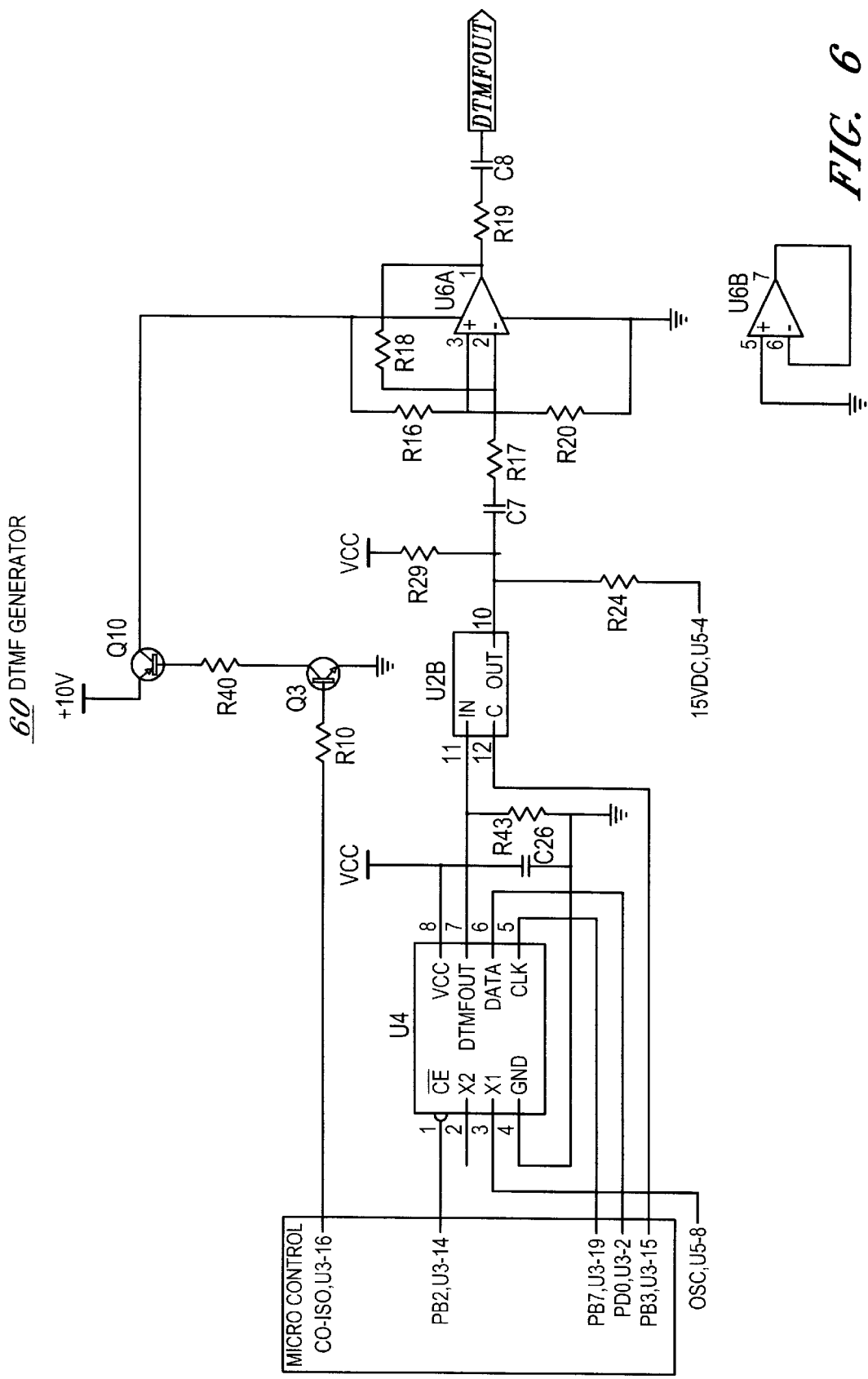
FIG. 6 shows a circuit diagram of the DTMF generator sub-circuit of the present invention.

FIG. 6 depicts the DTMF generator circuit 60 of system 10 which includes DC level shifter U2D. This level shifter, and operational amplifier U6A, are controlled by processor U3. Microcontroller U3 provides data and clock signals to circuit 60 and also turns the power "on" and "off" to the output of operational amplifier. Circuit 60 also prevents large DC pulses on the central office line 12 caused by the output of DTMF generator U4.

Processor U3 enables DTMF generator U4 via pin 1 (CE), provides a clock signal to U4 via pin 5 (CLK), and provides serial data to U4 via pin 6 (DATA). The high frequency oscillated clock signal is received from the DTMF receiver (U5) by U4 via pin 3. The signal is processed by U5 at pin 8 before it is sent to DTMF generator U4 at pin 3. The DTMF output from DTMF generator U4 (pin 7) is switched in and out by level shifter U2D. Resistors R24 and R29 and capacitor C7 ensure minimum DC pulsing at the start and end of each generated DTMF tone.

Operational amplifier U6A provides the generated DTMF signals to the central office TIP via bridge rectifier BR1 and off hook sensor 80 (opto isolators K1 and K5), as seen in FIG. 2. The output impedance of DTMF generator circuit while in the split mode is kept at a normalized value by resistor R19 and capacitor C8. The gain of op amp U6A is determined by the ratio of resistors R17 and R18. Resistors R16 and R20 preferably set the op amp DC output to mid power supply voltage, to maximize output voltage swing with varying input supply voltage. Power supply switch transistor Q10 is activated by transistor Q3 via resistor R40 by processor U3 (pin 16) via resistor R10.

With reference to FIGS. 8 through 19, the logic steps of the firmware preferably stored or programmed within microprocessor U3 will now be discussed in detail.

Figure 8:
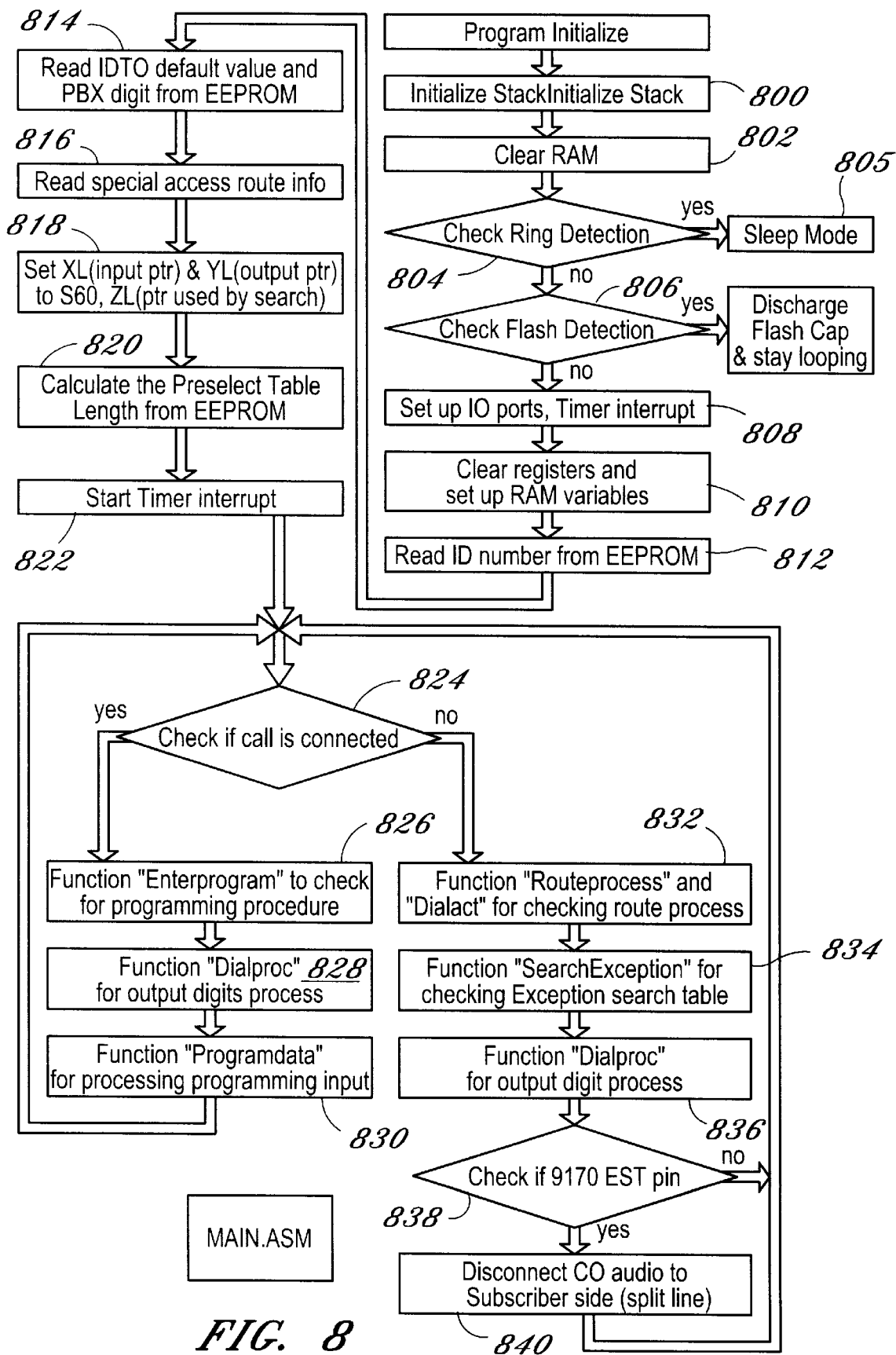
FIG. 8 shows the steps of main routine MAIN.ASM in flowchart form.

FIG. 8 shows a flowchart of one of the subroutines, entitled MAIN.ASM, of the present invention. This routine runs continuously. Step 800 initializes the stack and step 802 clears the RAM associated with processor U3. The charge of capacitor C1 (seen in FIG. 7), if any, is checked to determine if a ring is present, 804, or if a hook flash has occurred, 806. Should a ring be detected, the system is put into "sleep mode" via step 805 and no further action is taken, and the system is ready for an outgoing call. Steps 808–820 set the IO ports and timer interrupt, clears all registers, reads special digits such as ID numbers and private branch exchange ("PBX") digits and calculates the pre-select table length from the EEPROM. At this stage, if any PBX digits are entered by the subscriber, the process in of subroutine DTMFDET.ASM (FIG. 10) is used for analyzing the entered PBX digits.

Figure 9:
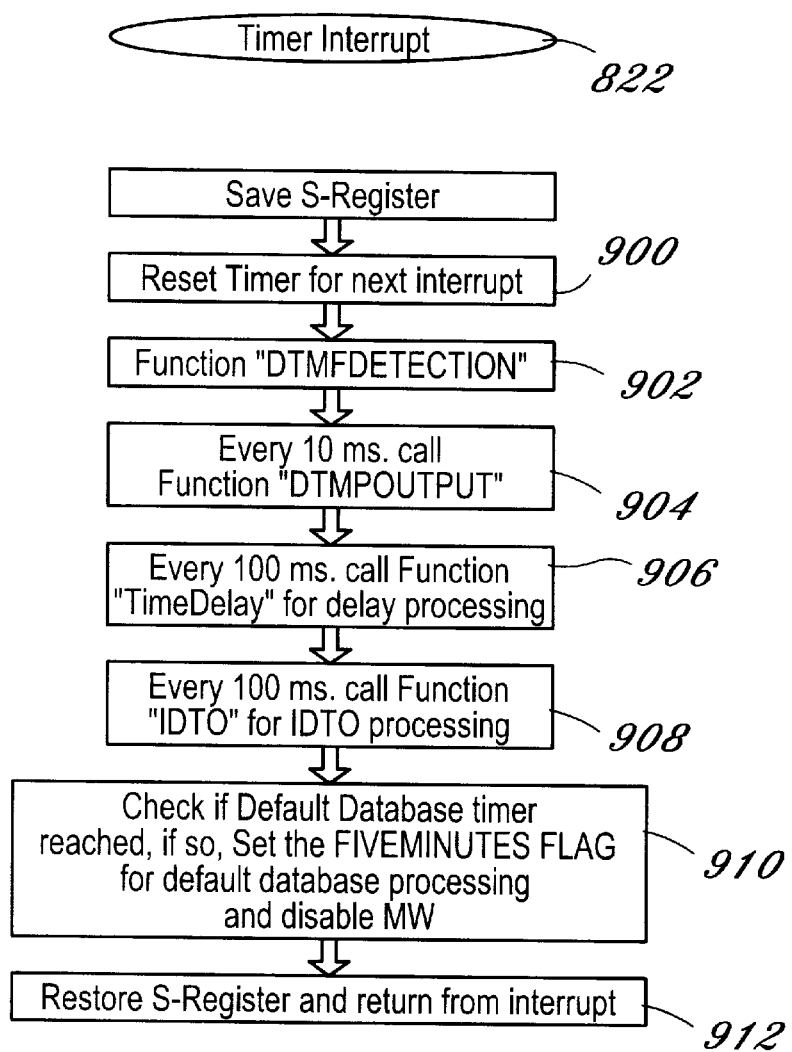
FIG. 9 shows the steps of interrupt routine INTRA.ASM in flowchart form.

At this point, subroutine INTR.ASM 822 is called. The INTR.ASM routine, shown in FIG. 9, is an interrupt routine that resets the timer for the next interrupt, 900, performs standard initializations, and detects the incoming DTMF signals 902. It is from this routine that other routines are invoked.

Figure 10:
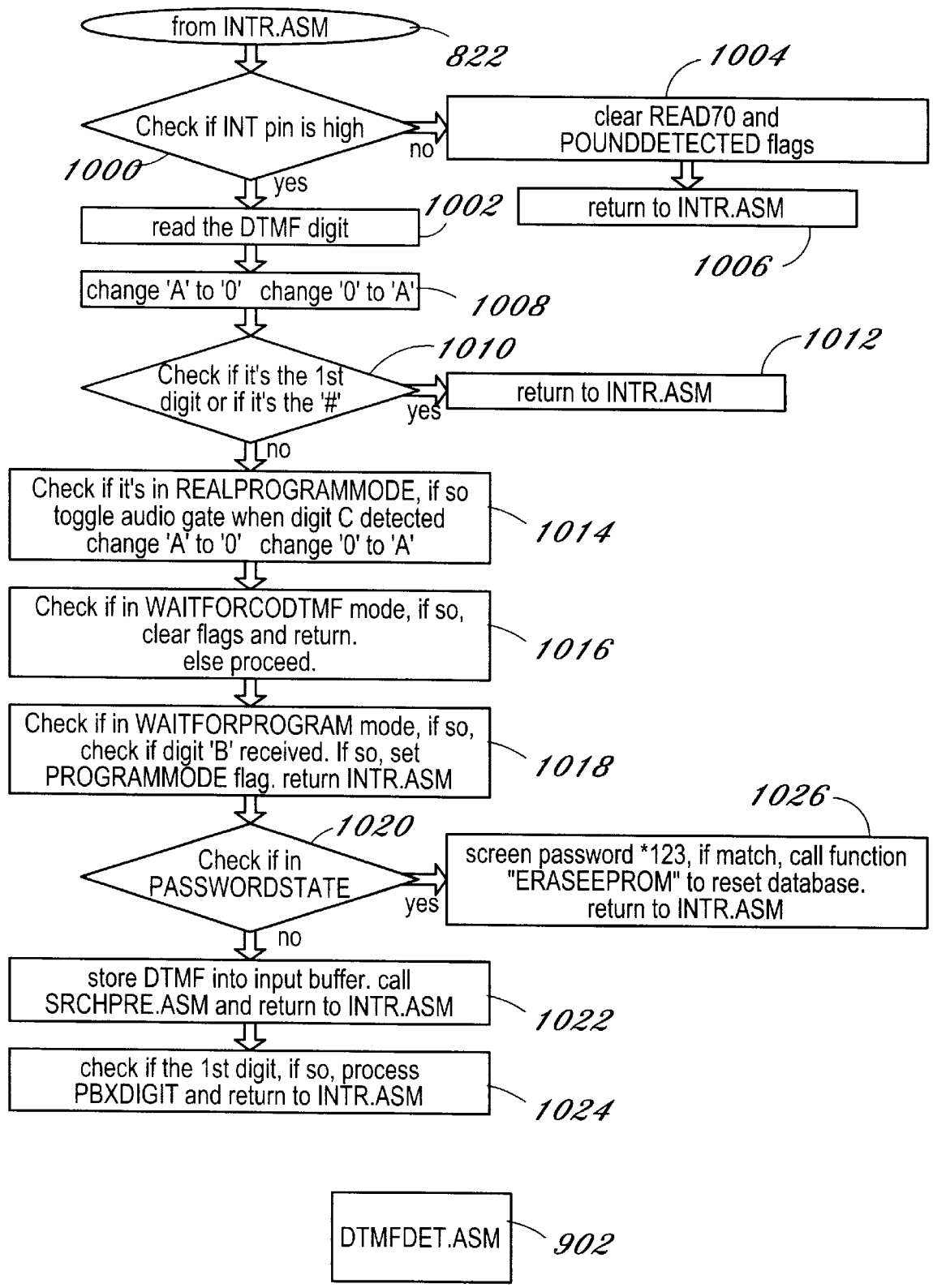
FIG. 10 shows the steps of the DTMF detection routine DTMF.ASM in flowchart form.

The steps of routine DTMFDET.ASM 902 can be seen in FIG. 10. This routine performs the DTMF signal detection. It first determines if the INT pin is "HIGH", (STD pin 15, on U5, in FIG. 5), via step 1000. If U5-pin 15 is "HIGH", processor U3 knows that a valid DTMF digit has been detected, and the digit is read, 1002. If INT is not "HIGH", the program returns to the INTR.ASM interrupt routine, via steps 1004–1006. A "#" entered as a first digit does not qualify as a valid digit which needs to be analyzed; therefore the program returns to the INTR.ASM routine, via steps 1008–1012 in such circumstances. If, however, the first digit is not a "#" symbol, the routine checks to see if subroutine REALPROGRAMMODE is in effect, 1014. This sub-routine checks to see if the central office is forwarding any digits. If so, these digits ate not to be processed. The audio from the central office ends when digit "C" is detected, 1014. The sub-routine determines if any additional digits are being sent (steps 1016–1020), or if a PBX digit is present, 1024. If a PBX digit is present it is processed at step 1024. Step 1022 stores the DTMF digit into an input buffer, calls subroutine SRCHPRE .ASM (FIG. 13) and the program returns to the INTR.ASM routine.

Figure 11:
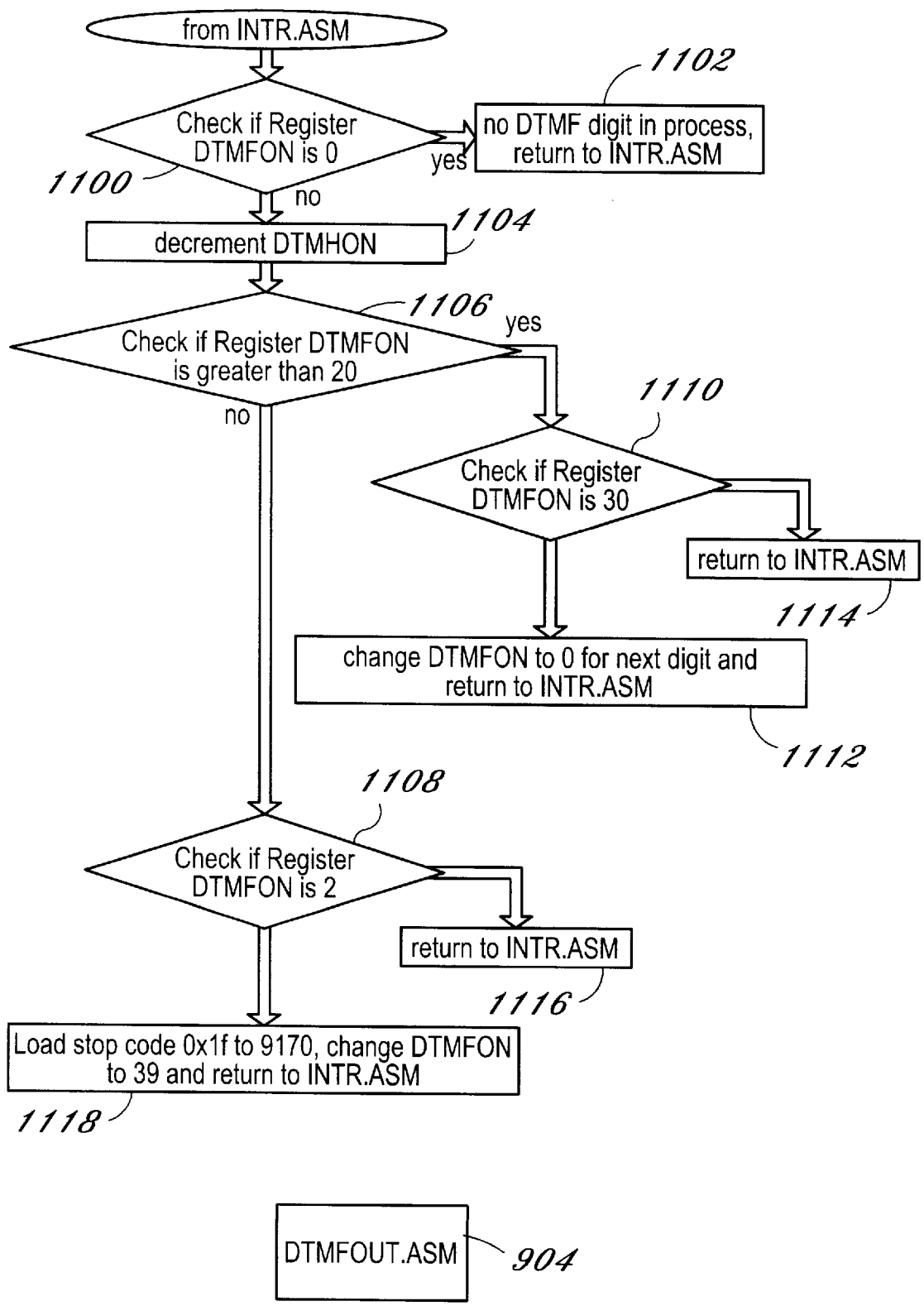
FIG. 11 shows the steps of the DTMF output routine DTMFOUT.ASM in flowchart form.

Every 10 milliseconds, sub-routine DTMFOUT.ASM 904 is called. The flowchart depicting this routine is shown in FIG. 11. This routine first checks if register DTMFON is 0, via step 1100. If it is, then no DTMF digit is in process, and the routine returns to INTR.ASM, 1102. If DTMFON is not 0, the register is decremented at step 1104 and the value in the DTMFON register is checked to see if it is preferably greater than a value of 20 (step 1106), and if so whether it is equal to a value of 30 (step 1110). If yes, register DTMFON is set to 0 for the next digit and the routine returns, at step 1112, to interrupt routine INTR.ASM. If the value in register DTMFON is not equal to 30, the program also returns to INTR.ASM.

If the value of register DTMFON is less than or equal to 20, but not equal to 2, the routine is called back to INTR-.ASM at steps 1108 and 1116. If the value of DTMFON is equal to 2, a stop code signal is sent to analog gate U5 by step 1118 which shuts gate U5 off to eliminate popping sound due to dc signal shifting. The register DTMFON is set to a value of 39 and the program returns to interrupt routine INTR.ASM.

Figure 12:
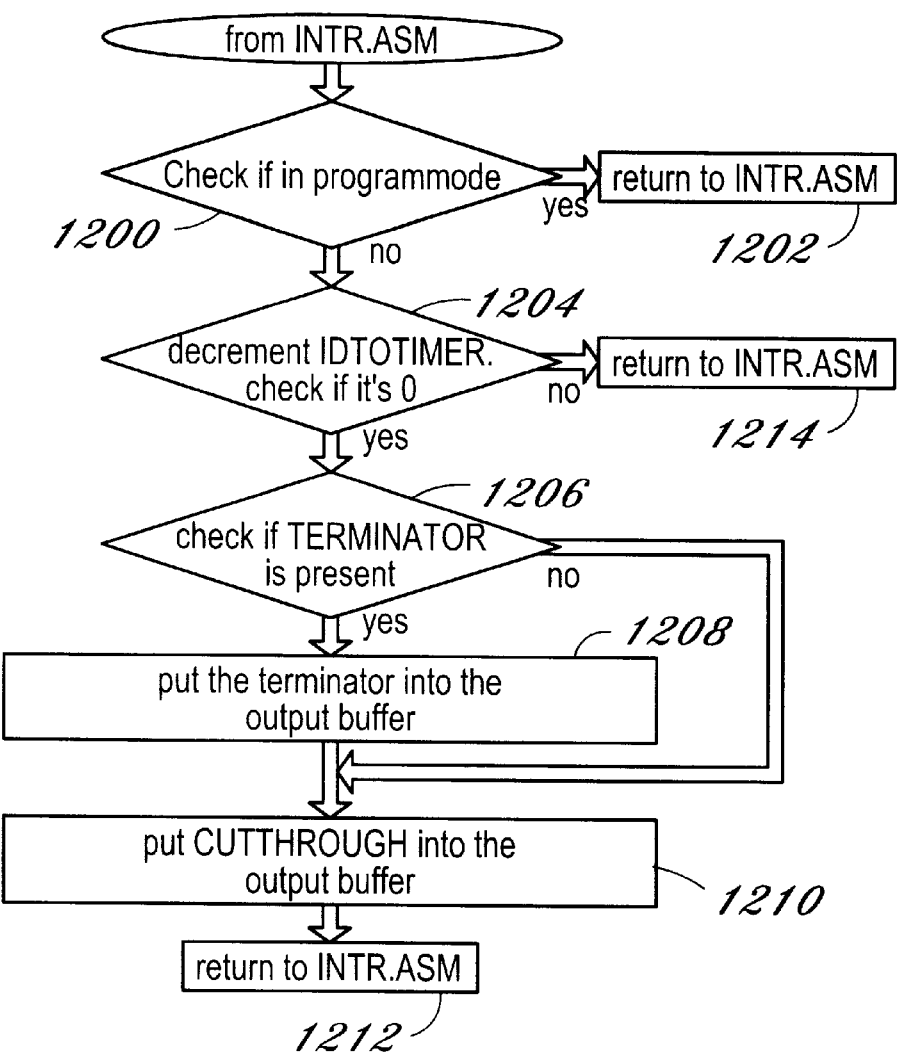
FIG. 12 shows the steps of the timer circuit IDTO.ASM routine in flowchart form.

Referring once again to FIG. 9, which shows the steps of the interrupt routine INTRA.ASM, step 908 invokes subroutine IDTO.ASM. This routine, seen in flowchart form in FIG. 12, is a timer routine to check when the last DTMF digit has been received.

The first step 1200 of the IDTO.ASM routine checks to see if program mode is in effect. If so, the program returns, at step 1202, to the interrupt routine INTR.ASM. If program mode is not in effect, the following occurs: step 1204 decrements register IDTOTI.MER, until it is equal to zero; once register IDTOTIMER is decremented to "0" steps 1206–1208 insure the last digit of the string has been sent and transmits a signal, stored in the TERMINATOR buffer, to the central office informing them that the last DTMF digit has been received; and steps 1210 and 1212 allow the subscriber circuit to be "cut-through" to join the central office circuit, and return the program to the INTR.ASM routine. If, after IDTOTIMER has been decremented and its value is still not zero, the program returns to INTRA.ASM, at step 1214 and continues to loop until register IDTO-TIMER equals 0.

After a valid DTMF digit has been detected using the DTMFDET.ASM subroutine 902, shown in FIG. 10, the digit is analyzed and compared to search tables preferably loaded within the microprocessor.

Figure 13:
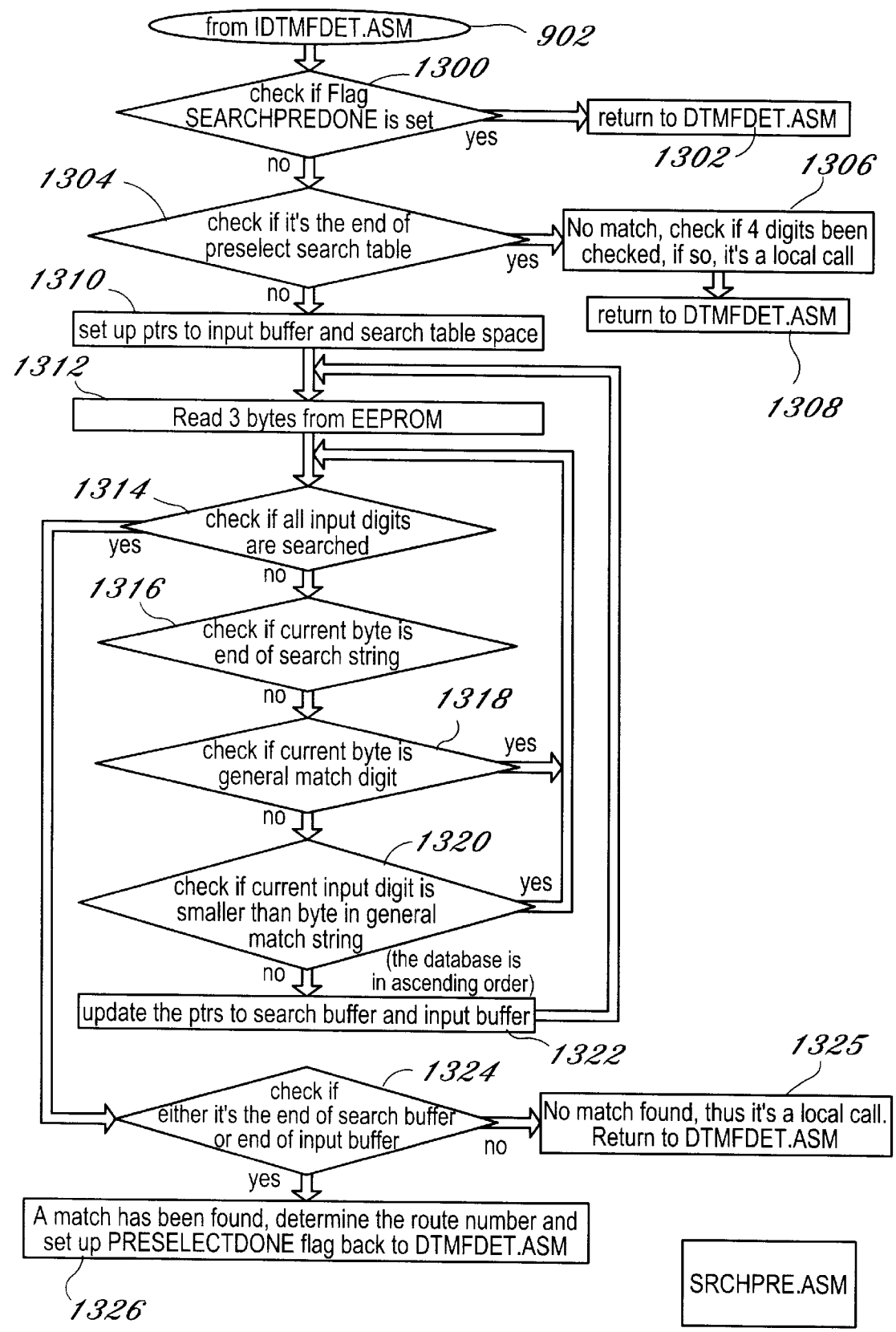
FIG. 13 shows the steps of the data string search routine SRCHPRE.ASM in flowchart form.

FIG. 13 shows the subroutine SRCHPRE.ASM that is called from DTMFDET.ASM routine 902. Step 1300 first checks to see if the search has already been done, and if so, the program returns to DTMFDET.ASM 902 routine via step 1302. It is next determined if the end of the pre-select search or look-up table has been reached (step 1304). If it has and none of the DTMF digits match the table's digits, a local call procedure is to be started, and the program returns for further DTMF signal detection (steps 1306 and 1308). As there was no match after four digits, a recognized three-digit area code preceded by a number "1" was not found on the processor's table. Thus, the system recognizes this no-match condition as a local call, and does not get involved.

Steps 1312–1324 comprise a sub-routine that-examines 3 bytes of data at a time from the EEPROM, compares the data string to the general match string of the processor's table and determines if, after four digits have been compared to the tables' values, a match has been found. Where a match has been found, the PRESELECTDONE flag is set, route information is determined and the program is returned to the DTMFDET.ASM routine, at step 1326. In either case, where a match has been found, or where the four digits have been checked against the numbers stored in the look-up table, the program returns to DTMFDET.ASM routine 902. If no match is found, it's a local call, and the program returns to DTMFDET.ASM routine 902 at step 1325.

Figure 14:
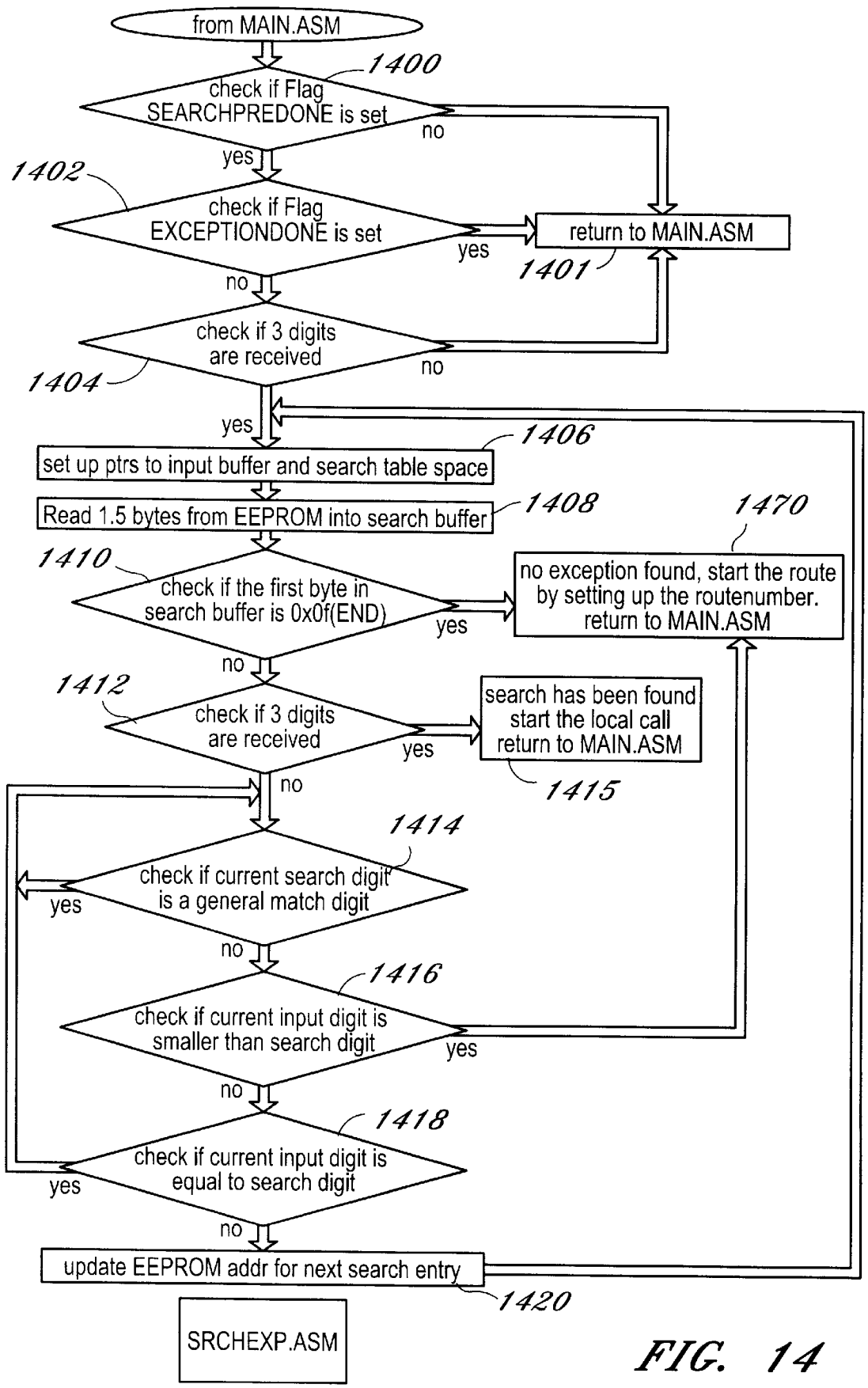
FIG. 14 shows the steps of the search exception routine SRCHEXP.ASM in flowchart form.

FIG. 14 shows, in flowchart form, the steps of the exception search routine, SRCHEXP.ASM. SRCHEXP.ASM first checks to see if an initiation match has been found in SRCHPRE.ASM, and does this by examining the state of the PRESELECTDONE flag at step 1400. This flag was set in the SRCHPRE.ASM routine, shown in FIG. 13, upon the finding of a match (FIG. 13, step 1326). If this flag has not been set, more digits are to be checked, and at step 1401 the program is returned to the main routine, MAIN.ASM.

At step 1402 the program checks to see if the exception search has been completed, and at step 1404 it is determined whether or not three digits have-been received. It is possible to have a match determined by routine SRCHPRE.ASM without three digits being checked. As such, the exception routine, illustrated in FIG. 14, requires that three digits, representing an area code, be entered and checked. At step 1406 the first digit is cleared, for the instances where a "1" is dialed prior to the dialing of an area code that does not receive a prefix code. After the first digit is cleared, the next three digits are examined for exceptions.

Step 1408 reads from the EEPROM, preferably 1.5 bytes of data into a search buffer. Since typically 4 bits, or 0.5 bytes represent each digit, 1.5 bytes of data is preferably chosen as it represent three digits. Steps 1410 and 1470 determine if the end of the search buffer has been reached, and if it has been reached, then no exceptions have been found and the selected route is to be started and the program returns to the main routine. At step 1412 it is assured that 3 digits have been searched, and at steps 1414–1418 the exception code search is performed. At step 1420 the EEPROM address is updated for the next search entry. If a match has been found the system will treat the call as a local call.

Figure 15:
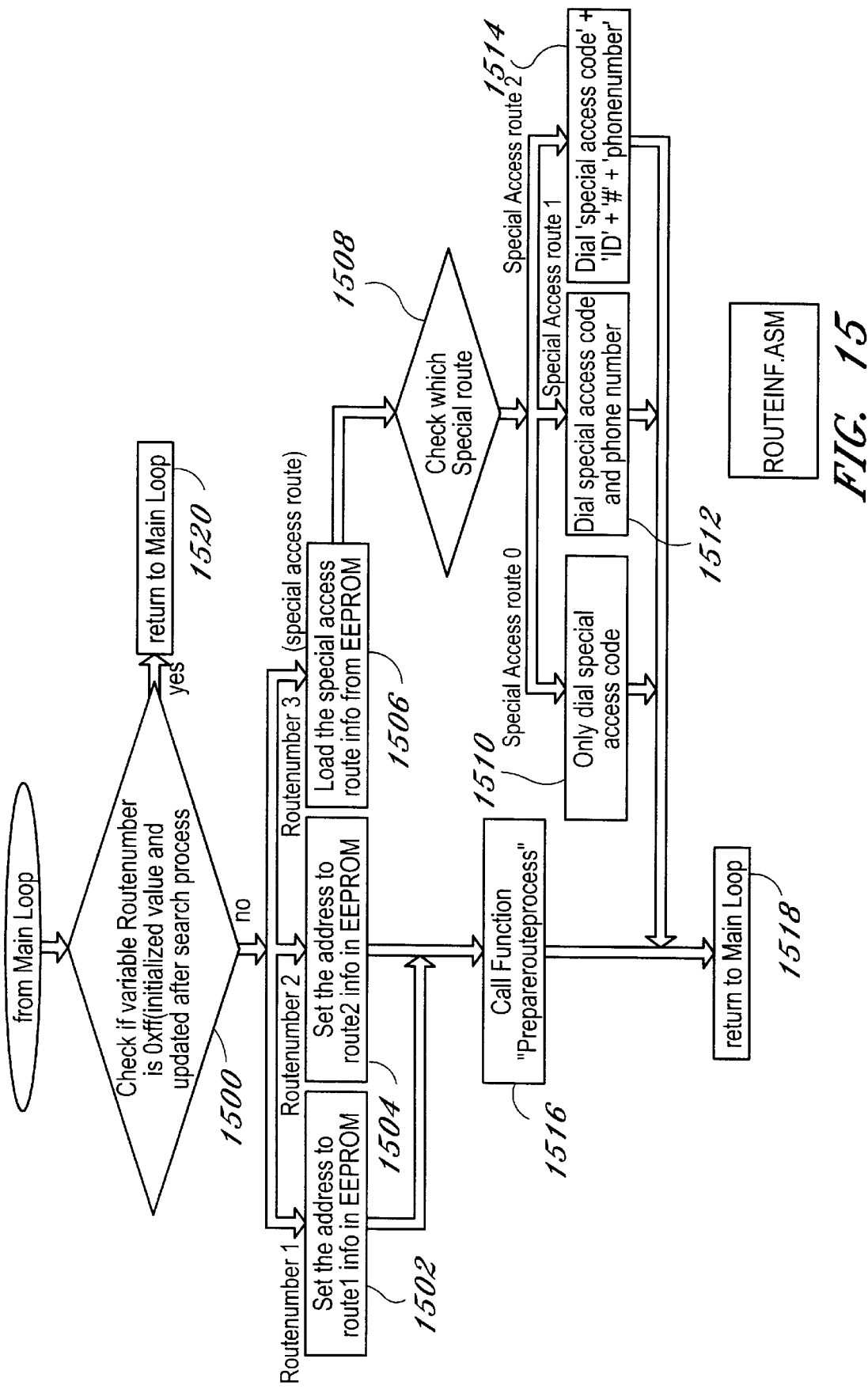
FIG. 15 shows the steps of the routing routine ROUTEINF.ASM in flowchart form.

FIG. 15 indicates the steps of the ROUTEINF.ASM routine, which essentially directs data stored in the EEPROM into different routes when commanded by the processor after SRCHEXP.ASM determines which route to start. Dialed telephone numbers may include the added prefix digits generated by the present invention in response to the detection of an appropriate area code, ID codes, pre-select digits such as a "1", and/or the user digits comprising the area code and telephone number followed by a "terminator" digit.

At step 1500 the "Routenumber", which is determined in SRCHEXP.ASM, is initialized to preferably a value of 1, 2, or 3. Corresponding addresses are set up in the EEPROM for routes 1 and 2 (see 1502 and 1504). For designated route 3, which is a special access route, preferably three special-access sub-routes can be loaded into the EEPROM (see steps 1506 and 1508). At step 1510 the special access code information is loaded. The special access codes can be digits such as 1-800. At step 1512 special access code and the phone number are loaded. At step 1514 the special access code, ID number, pre-select digit, and phone number are loaded. Upon receiving the 1-800 prefix, the central office will often respond with a voice message with further instructions followed by a series of DTMF digits. This activates the program mode of the main loop MAIN.ASM.

Referring once again to FIG. 8, steps 826–830 refer to the initial programming routines of the present invention, when system 10 is initially installed between central office 12 and subscriber circuit 14. Once system 10 is installed, the subscriber lifts the telephone in order to program the system, and the call is preferably connected to a remote location through the lines of the central office. Once connected, decision step 824 is "Yes" and the system knows that the subscriber wishes to program the system. The ENTRPROG.ASM routine is invoked if it has been determined that a call has been connected.

Figure 16:
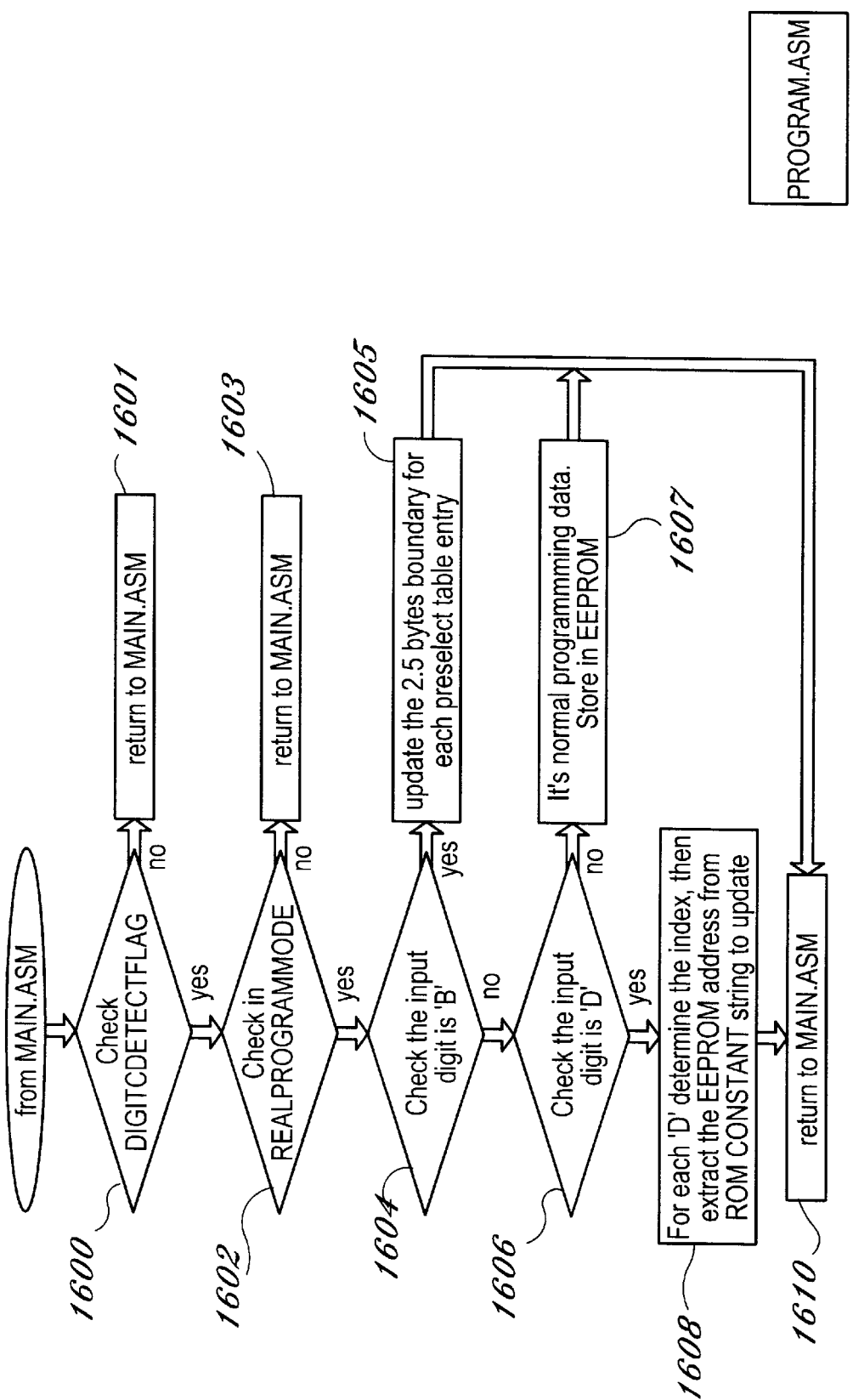
FIG. 16 shows the programming routine PROGRAM.ASM in flowchart form.
Figure 17:
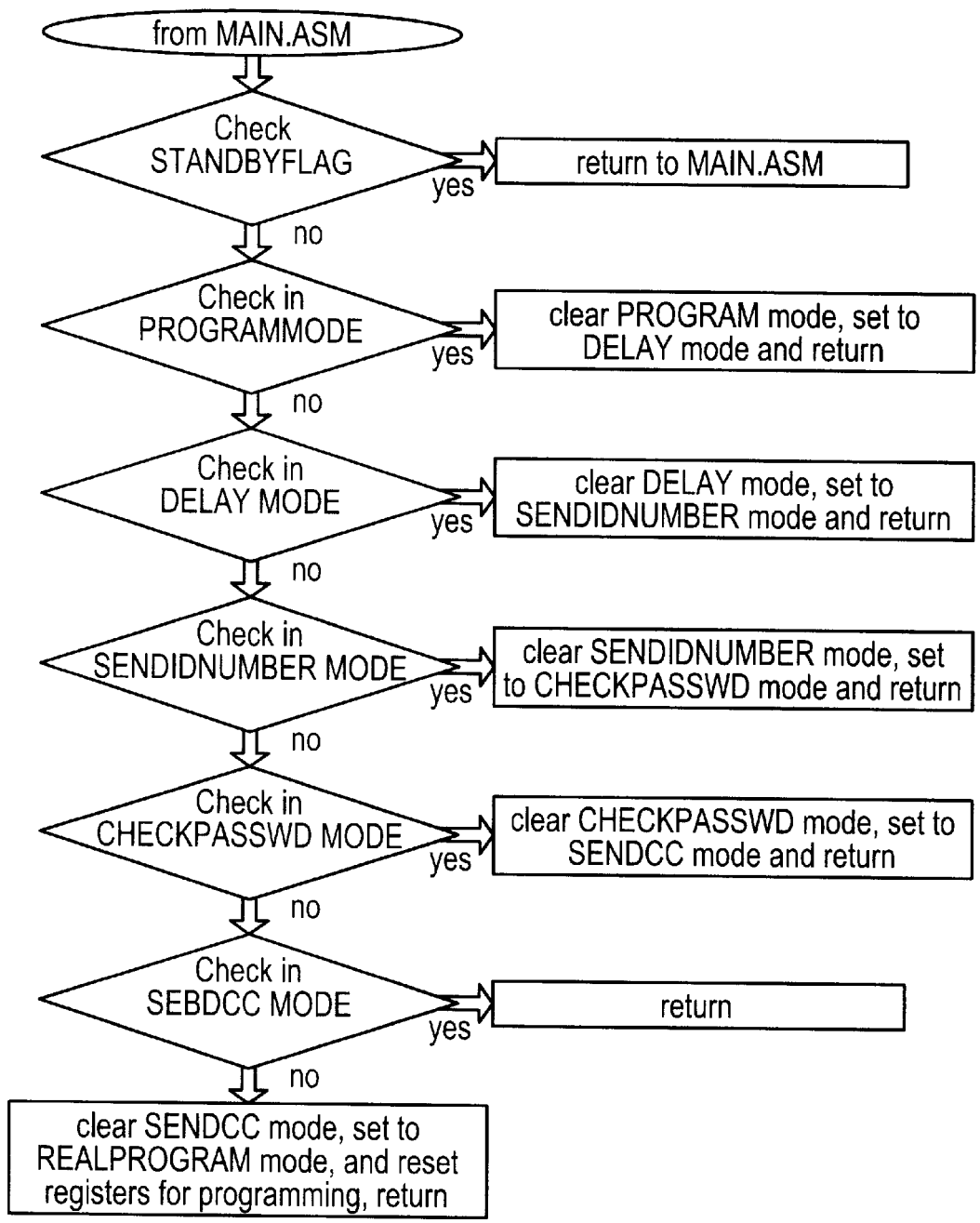
FIG. 17 shows the programming protocol routine ENTRPROG.ASM in flowchart form.
Figure 18:
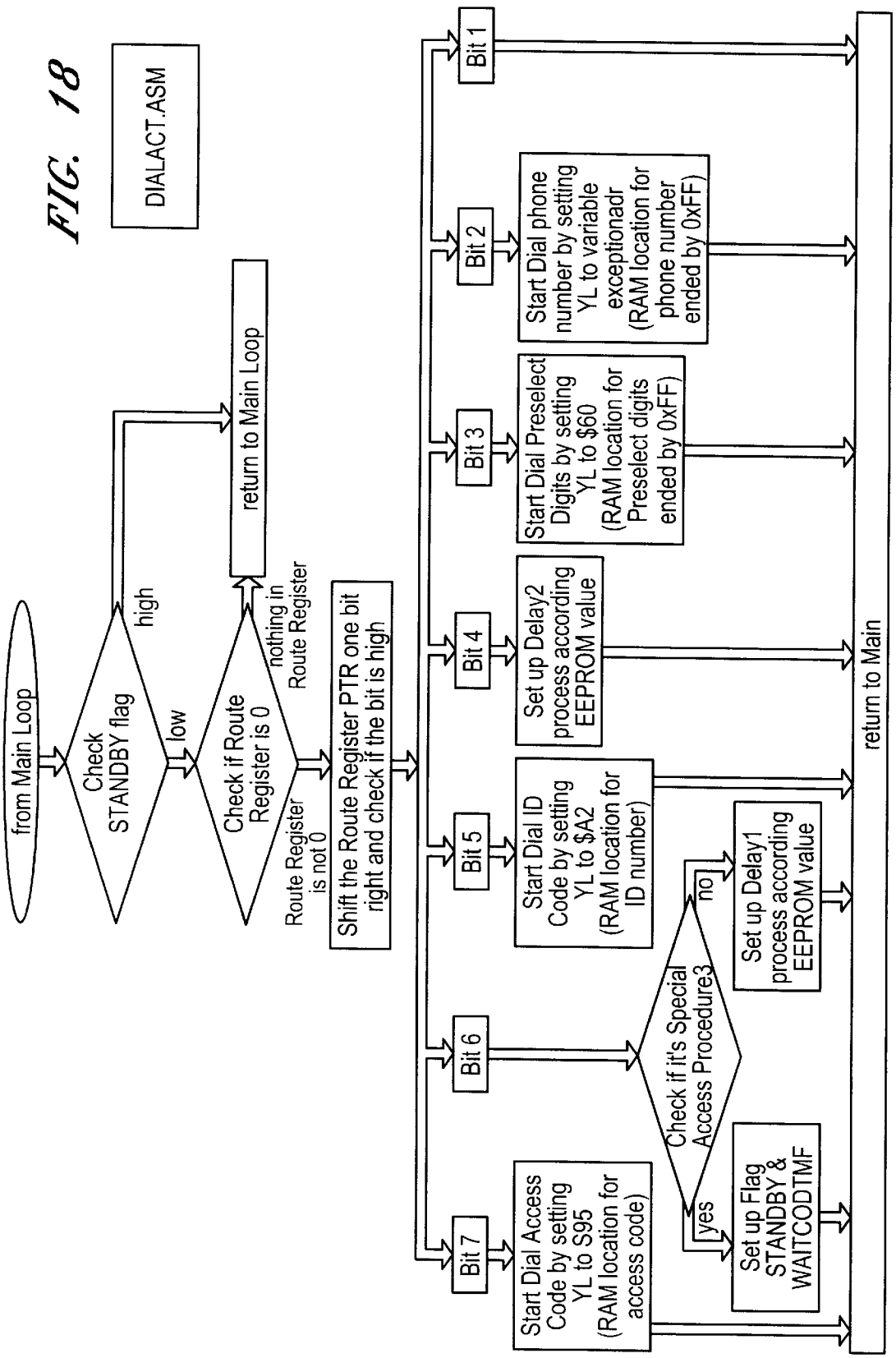
FIG. 18 shows the bit allocation routine DIALACT.ASM in flowchart form.

FIG. 15 sets the protocol for the programming procedure and processing handled by routine PROGRAM.ASM. FIGS. 15–17 illustrate the steps taken by the code to invoke the programming portion of the system, which allows the subscriber to alter the default settings and create his or her own customized settings, including exception codes, dialing delay codes, and PBX digits. All programming is preferably performed, back and forth from the remote location to the system, by transmission through the telephone line of the central office. The preferred programming procedure can be as follows:

If the subscriber wishes to program the system, he lifts the receiver and dials a special access code that connects through the central office's telephone line the system to remote location, such as, but not limited to a service center for a "dial around" company associated with system 10. The remote location responds by sending a maximum of three DTMF signals to the subscriber's system 10. The system then delays preferably for one second to allow for network stabilization, after which the subscriber then dials the subscriber's ID number followed by a "#" signal. The remote location, upon receiving the ID signal, sends a programming password to the subscriber's system 10. The subscriber then responds by preferably dialing two DTMF digits which is sent, via the central office's, to the remote location, which puts the subscriber's system 10 in programming mode. The remote location then sends programming information to the subscriber's system 10. Should the remote location wish to send voice messages to the subscriber's system 10 to keep the subscriber from hanging up, a DTMF signal "C" will both proceed and follow the message. After receiving the last programming message, the subscriber's system 10 responds with preferably two DTMF digits, exits the programming mode and connects the subscriber to the remote location for either another voice message or for instructions to reset the default data, if the subscriber wishes, or to restart the programming mode.

Figure 19:
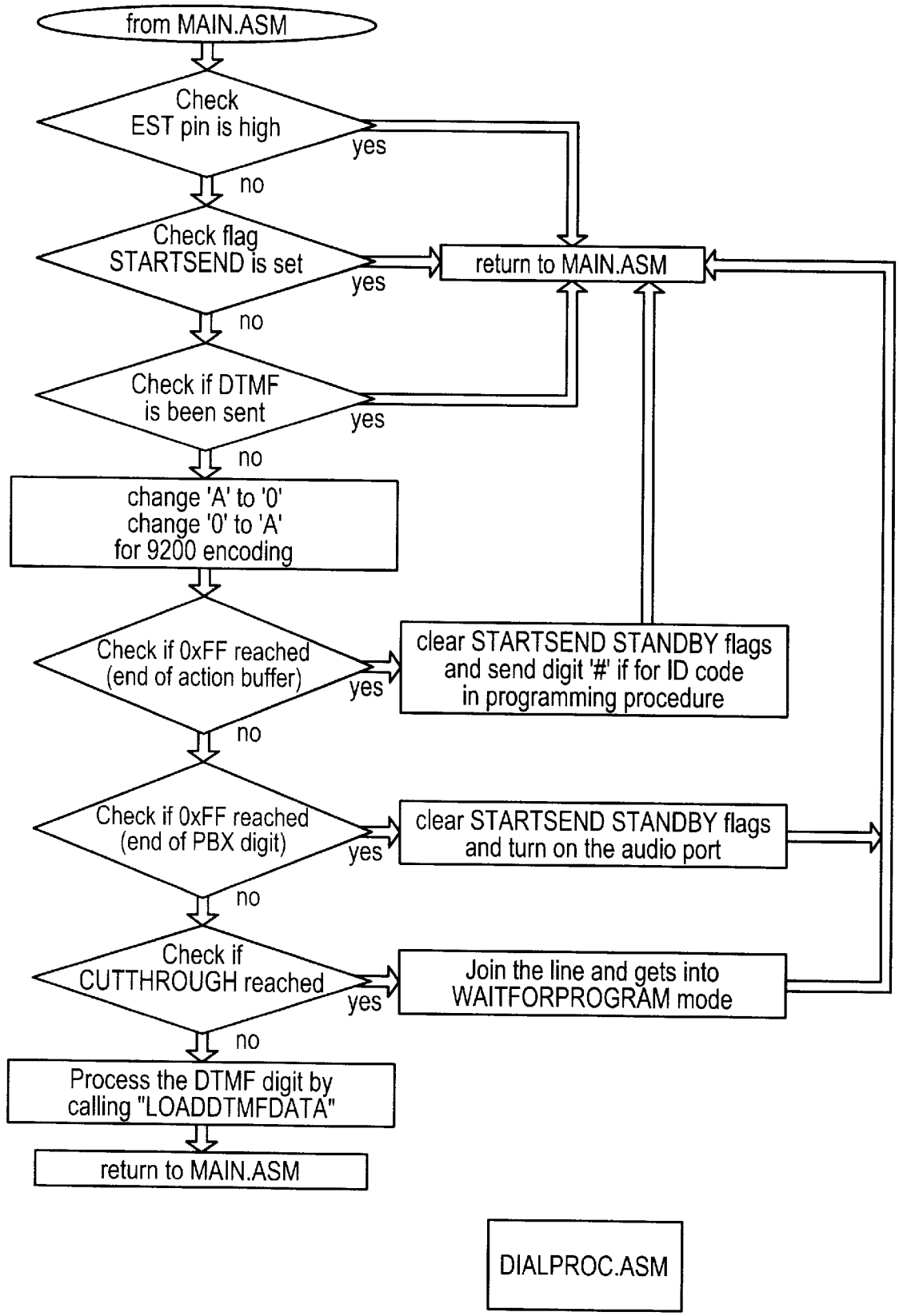
FIG. 19 shows the dialing procedure routine DIALPROC.ASM in flowchart form.

The DIALPROC.ASM routine of FIG. 19 writes DTMF digits to the EEPROM. It first determines if the EST pin is set to "HIGH". If yes, the program returns to the MAIN-.ASM routine since the processor knows that DTMF digits are on the central office circuit and the subscriber circuit must soon generate corresponding DTMF signals. Flag STARTSEND is checked to determine if DTMF digits are presently being sent. If this is true, the program once again returns to the main routine, MAIN.ASM. The routine then checks for PBX digits and identification codes that may be dialed prior to the actual DTMF digits. The DTMF digits are then loaded, one-by-one, in serial, via sub-routine LOAD-DTMFDATA.

In the preferred embodiment of the present invention, the method for utilizing system 10 is as follows:

In order for automated prefix dialing system 10 to be properly utilized, it must first be determined if an outgoing telephone call has been generated. If no outgoing call has been generated by the subscriber/user, system 10 does not activate, as the subscriber's phone has been lifted off the hook for a reason that does not benefit from the insertion of a prefix dialing code. Where the subscriber's phone is lifted "off hook", system 10 determines if the reason the phone has been taken off hook is due to a ringing on the line, by checking for a charge at capacitor C11. It does this by extracting enough of the DC ring signal from the network to charge capacitor C11. Capacitor C11 is charged during the ring cycle, generally 2 seconds, and discharges during the silence between rings, generally about 4 seconds.

After a non-ringing interval of approximately 5 seconds, the capacitor has completely discharged. The off-hook detector circuit can detect if the telephone is lifted. This is accomplished by a bi-directional sensor which allows the AC signal to pass while blocking the DC signal. When the telephone is lifted, a pre-determined amount of current is sensed. Capacitor C11 is immediately discharged, and the DC signal is allowed to pass through a series of voltage regulation circuits, powering up microprocessor U3. Until the subscriber's phone is lifted off hook, no power is feeding the system, since, without an off-hook scenario, no outgoing call can be made, and system 10 remains dormant.

Upon powering up (lifting the phone off hook), processor U3 closes switch K2. This, in turn, charges capacitors C2 and C3. This prepares the system's isolation circuit to be ready for operation. When the subscriber begins dialing digits, the DTMF receiver circuit starts detecting DTMF signals. Should the telephone hook be inadvertently depressed, and the incoming signal is lost momentarily, the firmware of processor U3 and the hook-flash memory timing circuit, allow the system to recognize the call as an existing one, and not a brand new call.

As soon as a valid incoming subscriber DTMF signal is detected by the receiver, the signal is amplified and is forwarded to the microprocessor, which in turn opens switch K4 and closes switch K3. This switching essentially isolates the subscriber's circuit from the central office circuit. Therefore, because the incoming DTMF tone was detected (within 10 milliseconds) and isolated (within 20 milliseconds), the central office has not yet detected a valid DTMF signal, which is approximately 40–50 milliseconds in duration. The DTMF digits are now sent to the microprocessor for processing.

The processor analyzes the incoming digits and determines if a prefix needs to be inserted prior to the subscriber-entered digits. If so, these prefix digits are generated by the DTMF generator circuit based upon the subscriber's programming instructions or the default settings. Even if no prefix is to be applied, DTMF signals, representing the subscriber's inputted digits must be generated and forwarded to the central office as if they were never intercepted by the subscriber's circuit. The central office ultimately receives the entire phone number, as dialed, with or without the prefix digits.

The isolation circuit, in conjunction with the processor, detects the DTMF signals quickly, isolates the system so the signals do not go on the main network to the central office, analyzes the digits to determine if any prefix digits need to be dialed, and sends all of the dialed digits back along the network to the central office as if no delay and isolation ever occurred. The central office, detecting valid DTMF signals for the first time, can now process the call accordingly.

The microprocessor of the system is provided with three types of memory (1) program memory, (2) temporary storage memory, and (3) non-volatile script programming. The program memory includes the stored firmware for the microprocessor. The firmware performs by looking at the profiles stored in the script memory. The script memory is partitioned with exception codes and activation decision codes. Examples of exception codes can be area codes that you don't want to insert a prefix dialer when the user is calling to a number in such area code. The activation codes can include for U.S. subscribers "1" for domestic long distance and "011" for international.

Thus, for a U.S. subscriber if the first digit dialed by a subscriber/user during an outgoing call is other than a "1" or system 10 knows that no prefix digits will be inserted, and the system generates the number dialed by the user and sends the generated tones to the central office and also reconnects the subscriber's phone to the central office. If the system sees a "011" or a "1", it then checks the stored exception codes. If no match is found it inserts the stored prefix dialer by generating its corresponding DTMF tones and then generates the number dialed by the user for sending to the central office as described above. If a match is found to one of the stored exception code(s) than no prefix dialer is required and the system generates the number dialed by the user for sending to the central office as again described above.

The exception codes are preferably programmed into the memory of the system during initial programming by the subscriber with the remote location via the phone lines. The system can be programmed to insert different prefix dialers depending on what type of call (i.e. domestic long distance vs. international; or based on different area codes; time of day outgoing call is being made, etc.). The system can also be programmed to select the quality of phone service (connection) to be provided.

The interactive voice response system for the present invention allows for reprogramming and updating remotely the present invention's routing information. The interactive voice response works by guiding the subscriber or end-user through a series of questions (decision trees) and voice messages. Program information is stored in a local database.

The interactive voice response system can manage several ports separately and independently. The main application initiates a process stream for each individual port. Each process stream waits for an incoming call and, upon receipt of this signal, starts the program that will guide the subscriber/end-user through all the steps necessary to initiate alternate network access service.

The interactive voice response system prompts the subscriber/end-user to enter his or her area code (which can be important for local calling rate exceptions). It then sends a signal to the connected present invention to get ready for programming. The interactive voice response system captures the subscriber's identification'number and sends back a password to the individual subscriber. The interactive voice response system also runs a checksum to ascertain that the transmission of information is accurate. Finally, it triggers a voice message that will preferably thank the subscriber/end-user for using the present invention and inform the subscriber/end-user that the services provided by the present invention are ready. Reprogramming of the present invention is relatively fast and can be accomplished within one to two minutes per unit.

Thus, the present invention is preferably designed to dial automatically all the prefix numbers necessary for PIC code or "dial-around" access to any chosen network. The present invention preferably snaps/connects into the telephone or fax line to automate all extra dial-action sequences. The present invention can be considered a true "plug and play" device, as subscribers can install the present invention themselves.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for automatically inserting a prefix dialer to an outgoing telephone call made by a user's telephone connected to a central office phone line, said method comprising the steps of:
    (a) prior to lifting a telephone off hook, storing an indicator when an incoming call is being made to a user's telephone;
    (b) determining whether a user has taken his or her telephone off hook to place an outgoing call or to answer an incoming call;
    (c) isolating the user's telephone from the central office phone line where step (b) determines that the user has taken his or her telephone off hook to place an outgoing call;
    (d) analyzing one or more DTMF digits entered by the user; and
    (e) automatically inserting a prefix dialer before the user entered DTMF digits if certain predefined conditions are met.

2. The method for automatically inserting a prefix dialer of claim 1 wherein step (a) comprises the step of charging a capacitor where an incoming call is being made to the user's telephone prior to the user taken his or her telephone off hook and step (b) comprises the step of checking for a charge on the capacitor once the user's telephone is lifted off hook; wherein a detected charge on the capacitor indicates an incoming call and no charge indicates an outgoing call.

3. An automated prefix dialer for inserting one or more prefix digits to an outgoing telephone call made by a user's telephone, said user's telephone connected to a central office phone line, said automated prefix dialer comprising:
    means for storing an indicator prior to lifting a telephone off hook when an incoming call is being made to a user's telephone;
    means for determining whether a user has taken his or her telephone off hook to place an outgoing call or to answer an incoming call;
    means for isolating the user's telephone from the central office phone line only where said means for determining determines that an outgoing call is being placed by the user;
    means for analyzing one or more DTMF digits entered by the user; and
    means for automatically inserting a prefix dialer before the user entered DTMF digits if certain predefined conditions are met.

4. The automated prefix dialer of claim 3 wherein said means for storing and said means for determining is a shadow ring circuit.

5. The automated prefix dialer of claim 3 further including means for powering said means for isolating, said means for analyzing, and said means for automatically inserting when the user's telephone is taken off hook.

6. A method of detecting and analyzing valid DTMF signals in a subscriber-initiated telephone call and generating one or more prefix DTMF digits in order to transfer said prefix digits and said DTMF digits to a telephone company's central office, comprising the steps of:
    prior to lifting a telephone off hook, storing an indicator when an incoming call is being made to a user's telephone
    determining whether a subscriber is initiating an outgoing telephone call or is answering an incoming call;
    applying power to a microprocessor upon the lifting of a telephone's handset by said subscriber;
    isolating the subscriber's telephone from the central office phone line wherein is determined that the user has taken his or her telephone off hook to initiated an outgoing call;
    detecting valid DTMF digits dialed by said subscriber upon said subscriber's outgoing call prior to said DTMF digits being communicated to said central office as a valid DTMF signal;
    comparing said detected DTMF digits to a table of predetermined values stored on said microprocessor in order to determine if certain prefix DTMF dialing digits should be communicated to said central office;
    generating said prefix digits;
    generating said detected DTMF digits;
    inserting said prefix digits onto said central office's communications circuit;
    inserting said DTMF digits onto said central office's communications circuit; and
    transferring said prefix digits and said DTMF digits to said central office via central office circuit such that said central office receives said DTMF digits as valid DTMF signals in the order in which they were entered by said subscriber.

7. The method of claim 6 wherein said step of determining whether an outgoing telephone call is going to be initiated by a subscriber or an incoming call is being made to the subscriber's telephone includes the step of determining if, at the time said subscriber's telephone was lifted off hook, a ring signal was present on a capacitor.

8. The method of claim 2 wherein the capacitor is discharged immediately after a charge is detected.

9. The automated prefix dialer of claim 3 wherein said means for storing comprises:
    a capacitor; and
    powerless means for charging a capacitor if an incoming call is made to the user's telephone, said powerless means charging said capacitor prior to the user taken his or her telephone off hook;
    wherein said means for determining comprises means for checking for a charge on the capacitor once the user's telephone is lifted off hook; wherein a detected charge on the capacitor indicates an incoming call and no charge indicates an outgoing call.

10. The automated prefix dialer of claim 3 wherein said means for analyzing comprises means for real time analyzing of one or more user entered DTMF digits prior to the user entering all of the DTMF digits required for the outgoing telephone call.

11. The method of claim 1 wherein step (d) comprises the step of real time analyzing one or more DTMF digits entered by the user prior to the user entering all of the DTMF digits required for the outgoing telephone call.

12. The method of claim 6 wherein the step of detecting valid DTMF digits dialed by said subscriber comprises the step of real time analyzing of one or more detected DTMF digits prior to the user entering all of the DTMF digits required for the outgoing telephone call.

13. The automated prefix dialer of claim 3 further comprising means for indicating that an outgoing call has been initiated after a temporary hook flash has occurred.

14. The method of claim 1 further comprising the step of indicating than an outgoing call has been initiated after a temporary hook flash has occurred.

15. The method of claim 6 further comprising the step of indicating than an outgoing call has been initiated after a temporary hook flash has occurred.

16. The method of claim 1 wherein step (e) includes inserting the prefix dialer prior to the user entering all of the DTMF digits required for the outgoing telephone call.

17. The automated prefix dialer of claim 3 wherein said means for automatically inserting the prefix dialer prior to the user entering all of the DTMF digits required for the outgoing call.

* * * * *